(12) United States Patent
Sekimoto et al.

(10) Patent No.: US 8,095,890 B2
(45) Date of Patent: Jan. 10, 2012

(54) METHOD FOR USER INTERFACE, DISPLAY DEVICE, AND USER INTERFACE SYSTEM

(75) Inventors: Nobuhiro Sekimoto, Yokohama (JP); Yasuhide Mori, Yokohama (JP); Masahiro Kato, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 788 days.

(21) Appl. No.: 12/169,659

(22) Filed: Jul. 9, 2008

(65) Prior Publication Data

US 2009/0019394 A1 Jan. 15, 2009

(30) Foreign Application Priority Data

Jul. 12, 2007 (JP) .................................. 2007-183606

(51) Int. Cl.
*G06F 3/00* (2006.01)
(52) U.S. Cl. ........................................ 715/811; 715/810
(58) Field of Classification Search .................... 715/811
See application file for complete search history.

(56) References Cited

U.S. PATENT DOCUMENTS

| 6,134,711 | A * | 10/2000 | Nakamura et al. ............ 717/169 |
| 2002/0122055 | A1* | 9/2002 | Parupudi et al. ............... 345/737 |
| 2003/0009771 | A1* | 1/2003 | Chang ............................ 725/135 |
| 2005/0055716 | A1* | 3/2005 | Louie et al. ..................... 725/58 |
| 2006/0190974 | A1 | 8/2006 | Lee |
| 2007/0061735 | A1* | 3/2007 | Hoffberg et al. .............. 715/744 |
| 2008/0040758 | A1* | 2/2008 | Beetcher et al. ................ 725/81 |
| 2008/0052639 | A1* | 2/2008 | Chun et al. .................... 715/810 |

FOREIGN PATENT DOCUMENTS

| JP | 07-182128 | 7/1995 |
| JP | 2002-342367 | 11/2002 |
| JP | 2007-158854 | 6/2007 |

OTHER PUBLICATIONS

Pekhteryev et al, "Content Aware Media Server for Multimedia Home Network", Jan. 2007, pp. 318-321.

* cited by examiner

*Primary Examiner* — Ashraf Zahr
(74) *Attorney, Agent, or Firm* — Antonelli, Terry, Stout & Kraus, LLP.

(57) ABSTRACT

A home system for supporting a life behavior, in which a user can effectively select a function or content quickly according to attributes and states of display devices arranged in respective locations and the user behavior. A storage unit holds location attribute information on the devices, time band dependent use frequency for each user, and location dependence of each. A user identifier input unit identifies a user using a function or content. When displaying a menu for the user to select a content and a function, a calculation unit references each database of the storage unit in accordance with the menu display state and generates menu content information correlated to the content and the function. A display unit displays such a menu that the user can easily select a content and a function with higher priority rank according to the menu content information.

8 Claims, 25 Drawing Sheets

FIG. 3

USER 1, TIME BAND-DEPENDENT CONTENT/FUNCTION FREQUENCY TABLE (201)

| CONTENTS/FUNCTIONS | | GET UP | WEEKDAY MORNING PREPARATION (301) | WEEKDAY AM (302) | HOLIDAY AM | WEEKDAY DAYTIME | HOLIDAY DAYTIME | ... |
|---|---|---|---|---|---|---|---|---|
| TV VIEW | DRAMA | 0 | 0 | 0 | 0 | 0 | 2 | |
| | NEWS, WEATHER | 21 | 41 | 0 | 7 | 0 | 3 | |
| | MUSIC | 0 | 0 | 0 | 0 | 0 | 0 | |
| | ... | | | | | | | |
| RECORDED PROGRAM VIEW | DRAMA | 0 | 0 | 0 | 2 | 0 | 5 | |
| | NEWS, WEATHER | 2 | 0 | 0 | 0 | 0 | 2 | |
| | MUSIC | 3 | 0 | 0 | 4 | 0 | 2 | |
| | ... | | | | | | | |
| | MAIL, WEB | 5 | 18 | 0 | 11 | 2 | 5 | |
| | GAME | 0 | 0 | 0 | 2 | 0 | 10 | |
| | PHYSICAL MANAGEMENT | 18 | 5 | 0 | 5 | 0 | 6 | |
| | SCHEDULE MANAGEMENT | 25 | 32 | 0 | 7 | 0 | 3 | |
| | ... | | | | | | | |

TIME BAND

FIG. 5

| USER 1, TIME BAND-DEPENDENT CONTENT/FUNCTION FREQUENCY TABLE 203 | | | LOCATION | | | | | |
|---|---|---|---|---|---|---|---|---|
| | | | LIVING ROOM | BEDROOM 1 | BEDROOM 2 | ... | REST ROOM | KITCHEN | FACE-WASHING PLACE | ... |
| CONTENTS/FUNCTIONS | TV VIEW | DRAMA | 3 | 2 | 0 | | 0 | 0 | 0 | |
| | | NEWS, WEATHER | 6 | 5 | 0 | | 10 | 0 | 18 | |
| | | MUSIC | 10 | 5 | 0 | | 2 | 0 | 0 | |
| | | ... | | | | | | | | |
| | RECORDED PROGRAM VIEW | DRAMA | 8 | 15 | 0 | | 0 | 0 | 0 | |
| | | NEWS, WEATHER | 0 | 0 | 0 | | 0 | 0 | 5 | |
| | | MUSIC | 25 | 5 | 0 | | 0 | 0 | 0 | |
| | | ... | | | | | | | | |
| | MAIL, WEB | | 9 | 22 | 0 | | 5 | 0 | 5 | |
| | GAME | | 0 | 0 | 0 | | 0 | 0 | 0 | |
| | PHYSICAL MANAGEMENT | | 8 | 23 | 0 | | 11 | 0 | 13 | |
| | SCHEDULE MANAGEMENT | | 3 | 23 | 0 | | 20 | 0 | 12 | |
| | ... | | | | | | | | | |

FIG. 6

| USER 1 RELATIONSHIP CONTENT/FUNCTION FREQUENCY TABLE | | PRESENT USER STATE | | | | | |
|---|---|---|---|---|---|---|---|
| CONTENTS/FUNCTIONS | | USER ALONE | USER 2 | USER 3 | USER 4 | 2 OR MORE | 1 OTHER THAN FAMILY | ... |
| TV VIEW | DRAMA | 8 | 3 | 0 | 0 | 0 | 0 | |
| | NEWS, WEATHER | 6 | 10 | 8 | 6 | 9 | 1 | |
| | MUSIC | 10 | 7 | 6 | 3 | 3 | 0 | |
| | ... | | | | | | | |
| RECORDED PROGRAM VIEW | DRAMA | 9 | 4 | 3 | 2 | 0 | 0 | |
| | NEWS, WEATHER | 7 | 0 | 2 | 0 | 0 | 0 | |
| | MUSIC | 15 | 4 | 2 | 2 | 1 | 0 | |
| | ... | | | | | | | ... |
| | MAIL, WEB | 21 | 3 | 0 | 2 | 0 | 0 | |
| | GAME | 12 | 4 | 8 | 3 | 6 | 1 | |
| | PHYSICAL MANAGEMENT | 15 | 20 | 0 | 0 | 0 | 0 | |
| | SCHEDULE MANAGEMENT | 15 | 5 | 0 | 0 | 0 | 0 | |
| | ... | | | | | | | |

USER 1, LOCATION USE TIME TABLE (WEEKDAY MORNING PREPARATION)

| LOCATION | USE TIME ||||  NUMBER OF TIMES |
|---|---|---|---|---|---|
| | SHORTEST | LONGEST | AVERAGE | TOTAL | |
| LIVING ROOM | 00:02:23 | 00:13:13 | 00:06:45 | 23:57:45 | 213 |
| BEDROOM 1 | 00:05:39 | 00:15:47 | 00:08:23 | 25:50:55 | 185 |
| BEDROOM 2 | 00:00:00 | 00:02:09 | 00:00:35 | 00:04:40 | 8 |
| REST ROOM | 00:01:05 | 00:21:48 | 00:02:51 | 09:38:33 | 203 |
| KITCHEN | 00:00:00 | 00:00:12 | 00:00:02 | 00:00:10 | 5 |
| LAVATORY | 00:03:50 | 00:06:51 | 00:05:22 | 18:52:22 | 211 |
| ... | | | | | |

206 — USER 1, FUNCTION USE TIME TABLE (WEEKDAY MORNING PREPARATION)

| CONTENTS/FUNCTIONS | | SHORTEST | LONGEST | USE TIME AVERAGE | TOTAL | NUMBER OF TIMES |
|---|---|---|---|---|---|---|
| TV VIEW | DRAMA | 00:02:56 | 00:11:46 | 00:04:21 | 00:08:42 | 2 |
| | NEWS, WEATHER | 00:00:35 | 00:14:23 | 00:05:15 | 01:45:00 | 20 |
| | MUSIC | 00:00:00 | 00:00:00 | 00:00:00 | 00:00:00 | 0 |
| | ... | | | | | |
| RECORDED PROGRAM VIEW | DRAMA | 00:00:00 | 00:00:00 | 00:00:00 | 00:00:00 | 0 |
| | NEWS, WEATHER | 00:00:37 | 00:13:21 | 00:04:38 | 01:51:12 | 24 |
| | MUSIC | 00:00:00 | 00:00:00 | 00:00:00 | 00:00:00 | 0 |
| | ... | | | | | |
| MAIL, WEB | | 00:00:03 | 00:06:12 | 00:01:21 | 00:48:36 | 36 |
| GAME | | 00:03:10 | 00:03:10 | 00:03:10 | 00:03:10 | 1 |
| PHYSICAL MANAGEMENT | | 00:01:18 | 00:06:44 | 00:03:45 | 01:22:11 | 22 |
| SCHEDULE MANAGEMENT | | 00:00:08 | 00:05:29 | 00:03:14 | 00:58:04 | 18 |
| ... | | | | ... | | |

801 (highlighted: 00:05:15)

FIG. 9

| SET NUMBER | FUNCTION PROGRAM | PARAMETER | DISPLAY CONTENT |
|---|---|---|---|
| 0 | SUB-MENU DISPLAY | 1 | TV |
| 1 | TV VIEW | GENRE = DRAMA | DRAMA |
| 1 | TV VIEW | GENRE = NEWS, WEATHER | NEWS, WEATHER |
| 1 | TV VIEW | GENRE = MUSIC | MUSIC |
| ... | ... | ... | ... |
| 0 | SUB-MENU DISPLAY | 2 | RECORDED PROGRAM |
| 2 | RECORDED PROGRAM | GENRE = DRAMA | DRAMA |
| 2 | RECORDED PROGRAM | GENRE = NEWS, WEATHER | NEWS, WEATHER |
| 2 | RECORDED PROGRAM | GENRE = MUSIC | MUSIC |
| ... | ... | ... | ... |
| 3 | MAIL, WEB | — | MAIL, WEB |
| 4 | GAME | — | GAME |
| 5 | PHYSICAL MANAGEMENT | — | PHYSICAL MANAGEMENT |
| 6 | SCHEDULE MANAGEMENT | — | SCHEDULE MANAGEMENT |
| ... | | | |

| SET NUMBER | FUNCTION PROGRAM | PARAMETER | DISPLAY CONTENT | PRIORITY |
|---|---|---|---|---|
| 0 | SUB-MENU DISPLAY | 1 | | 0.78 |
| 1 | TV VIEW | | TV | 0.00 |
| 1 | TV VIEW | GENRE = DRAMA | DRAMA | 0.78 |
| 1 | TV VIEW | GENRE = NEWS, WEATHER | NEWS, WEATHER | 0.01 |
| ... | | | | |
| 0 | SUB-MENU DISPLAY | 2 | | 0.62 |
| 2 | RECORDED PROGRAM | | RECORDED PROGRAM | 0.00 |
| 2 | RECORDED PROGRAM | GENRE = DRAMA | DRAMA | 0.62 |
| 2 | RECORDED PROGRAM | GENRE = NEWS, WEATHER | NEWS, WEATHER | 0.10 |
| ... | | GENRE = MUSIC | MUSIC | ... |
| 3 | MAIL, WEB | — | MAIL, WEB | 0.38 |
| 4 | GAME | — | GAME | 0.00 |
| 5 | PHYSICAL MANAGEMENT | — | PHYSICAL MANAGEMENT | 0.29 |
| 6 | SCHEDULE MANAGEMENT | — | SCHEDULE MANAGEMENT | 0.41 |
| ... | | | | |

FIG. 20
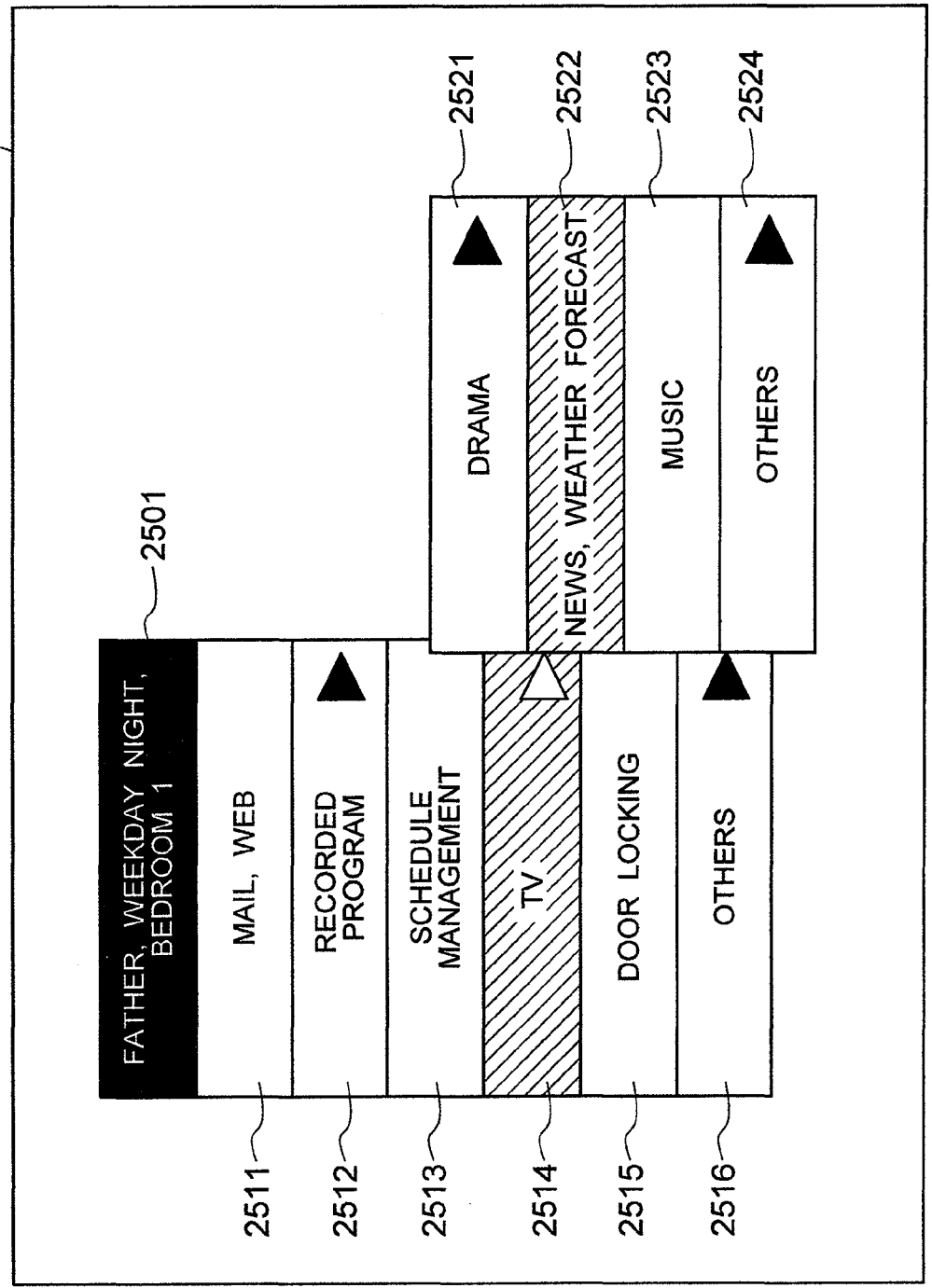

FIG. 22

USER 1 LOCATION TRANSITION TABLE (WEEKDAY MORNING PREPARATION) — 207

| | | LOCATION AFTER MOVEMENT | | | | | | |
|---|---|---|---|---|---|---|---|---|
| | | LIVING ROOM | BEDROOM 1 | BEDROOM 2 | REST ROOM | KITCHEN | FACE-WASHING PLACE | ... |
| LOCATION BEFORE MOVEMENT | LIVING ROOM | 0 | 22 | 1 | 9 | 0 | 3 | |
| | BEDROOM 1 | 6 | 0 | 0 | 12 | 1 | 18 | |
| | BEDROOM 2 | 1 | 5 | 0 | 1 | 2 | 2 | |
| | REST ROOM | 15 | 1 | 1 | 0 | 1 | 8 | |
| | KITCHEN | 3 | 2 | 0 | 1 | 0 | 1 | |
| | LAVATORY | 8 | 3 | 1 | 1 | 1 | 0 | |
| | ... | | | | | | | ... |

USER/CONTENTS · FUNCTION SELECTION HISTORY 208

| ITEM NUMBER | DATE | START TIME | END TIME | FUNCTION | PARAMETER | LOCATION | ANOTHER USER |
|---|---|---|---|---|---|---|---|
| 1 | 2007/03/15 | 06:30 | 06:40 | TV VIEW | NEWS, WEATHER | BEDROOM | USER 2 |
| 2 | 2007/03/15 | 06:40 | 06:50 | SCHEDULE MANAGEMENT | 2007/03/15 | BEDROOM | NONE |
| 3 | 2007/03/15 | 06:55 | 07:00 | TV VIEW | INFORMATION PROGRAM | BEDROOM | NONE |
| 4 | 2007/03/15 | 07:00 | 07:03 | TV VIEW | INFORMATION PROGRAM | LIVING ROOM | USER 2, USER 3, USER 4 |
| 5 | 2007/03/15 | 07:03 | 07:15 | MAIL, WEB | PROVIDER 1 | REST ROOM | NONE |
| 6 | 2007/03/15 | 07:15 | 07:20 | TV VIEW | NEWS, WEATHER | FACE-WASHING PLACE | NONE |
| ... | ... | ... | ... | ... | ... | ... | ... |

METHOD FOR USER INTERFACE, DISPLAY DEVICE, AND USER INTERFACE SYSTEM

INCORPORATION BY REFERENCE

The present application claims priority from Japanese application JP2007-183606 filed on Jul. 12, 2007, the content of which is hereby incorporated by reference into this application.

BACKGROUND OF THE INVENTION

The present invention relates to a user interface method, a display device, and a user interface system for providing a system function and a content which support user's life behavior and in particular, to a user interface, a display device, and a user interface system which enable a user to effectively select a system function and a content according to an attribute and a state of display devices arranged in various places.

Recently, performance of video information devices has been significantly improved and it has become possible to simultaneously record videos of a plenty of broadcast channels for a long time. Moreover, with the spread of digital broadcast, such as the digital terrestrial broadcasting, the number of broadcast channels has been increased and the number of videos provided to a viewer has been almost doubled. As a result, the user should effectively select a favorite video from a plenty of the videos. For this, an electronic program guide (EPG) or table is available as metadata explaining the contents of the video data. The user selects a program to be viewed from the guide. The user can automatically extract a program having a keyword matched with the keyword specified by the user. Furthermore, provided now is a function to support the user to select a program by extracting a keyword, a category of news and sports to which videos belong, the day of the week and the time band which are often specified by the user, from the user selection history.

Moreover, also provided is an application which supports a user behavior around the videos. For example, when recording a video, a physical or symbolic feature of the video data is extracted and an important portion is extracted to be played back according to the feature. Recording devices capable of performing the so-called digest view are available on market. By using the digest view function, it is possible to grasp the content in a short time as compared to the time required for viewing the entire video.

Furthermore, there are often cases when a display device is required for a user behavior support application not directly relating to the broadcast video. The applications are also displayed on the screen used for displaying videos such as a television. For example, in addition to display of a personal computer and a game, by establishing a communication protocol in a device managing the home facilities such as a lamp, it is possible to modify the state display and the operation state of them. In near future, various applications will provide information on the display device for safely and user-friendly supporting various life aspects including ecology (energy saving, resource re-use) and a health care.

On the other hand, the display devices are often installed in respective rooms of a house. Furthermore, there are devices which can be installed in a bathroom and a kitchen. As various apparatuses and devices corresponding to the domestic network are spread, it is expected that the user has more chances to see the display devices while doing something. Moreover, at the place where a display device exists, means for inputting user operations also exists. The operation of various functions using the means will be naturally performed in the daily life.

Considering this, various functions can support user behaviors via a plenty of display devices and input means. However, it will be not easy for the user to rapidly select a desired function or content among the plenty of functions via the plenty of display devices. For this, it is necessary to provide a method for presenting a menu for selecting an appropriate function and a content in accordance with the user's condition.

In order to solve this problem, suggested is a method for patternizing a plurality of functions which have been selected in the past and narrowing a range of functions which may be selected next. For example, JP-A-7-182128 discloses a method for improving the operation efficiency by an operator in the office job by using an operation frequency table concerning a terminal, an operator, a date and time, and a department as conditions of the job selection and creating a menu which displays a job item having a higher probability at the superior position, thereby providing a user-friendly interface.

On the other hand, also suggested is such a method that a server acquires a user ID, a location, and a condition from the terminal operated by a user and compares them to find a content having a matched condition. For example, JP-A-2002-342367 discloses a method for searching information (contents) owned by an information provider and providing it in accordance with the user condition. That is, necessary elements such as a user ID, a time band, a region code (location), a weather and temperature, a behavior category are acquired to search a matched behavior pattern from a behavior pattern DB analyzed and registered in advance. The searched pattern is compared to the content distribution condition so as to select an information content to be provided. Thus, it is possible to select an appropriate content.

However, these conventional techniques have difficulty in displaying a menu for selecting a function and a content for optimizing the behavior (reducing the time required for a target behavior, simultaneously performing viewing and other behavior, and the like) performed normally by the user under so-called ubiquitous display devices at home.

That is, JP-A-182128 has no consideration on the case when operations are performed at home. When operations are performed at home, it is necessary to create a menu specific to home considering the behavior typical to the behaviors at home, i.e., the uneven possibility of function selection caused by the attribute of the room where a display device exists, an uneven possibility of function selection considering the time when the user is present in the room, and protection of privacy when other members of a family or a guest are present.

Moreover, JP-A-20020342367 discloses a content search and content presentation considering the place. However, only data on the vicinity of the place is presented and no attribute of the place is considered. Moreover, the invention of the document has an object to search the information (content) owned by the information provider and provide it to a user according to the user condition, and the invention does not relate to a technique to be used for an ordered display of functions or contents in a menu for helping the selection by the user.

SUMMARY OF THE INVENTION

According to an aspect of the present invention, provided is a user interface method in a system which provides a content and a function to a user and which includes an operation unit, a display unit, an identifier input unit, a storage unit, a clocking unit, and an operation input unit.

The storage unit holds: a location-dependent content/function frequency table which depends on locations prepared for each user and describes a frequency of each content and each function; a time band-dependent function frequency table which depends on a time band prepared for each user and describes a priority rank for each function; a user verification database; a user relationship-dependent content/function frequency table which describes a frequency of a content and a function prepared for each user and selected when other user exists; a location use table which describes the use time belonging to the location prepared for each user; a function use table which describes the time used for each content and function; and at least one content or a function program.

When the display unit is in the vicinity of the identifier input unit and when the user exists in the vicinity of the identifier unit, the operation unit acquires user identification feature information for identifying a user to be inputted to the identifier input unit, the date and time information from the clocking unit, the location attribute information as attribute information concerning the predetermined location where the display unit and the identifier input unit are arranged, and the user coexistence relationship from the identifier input unit.

The operation unit identifies a user by using the user identification feature information and the user verification database and acquires the location-dependent content/function frequency table and the time band-dependent content/function table concerning the identified user from the storage unit.

Next, a priority rank for each content and function is performed by calculating a portion of the location-dependent content/function frequency table corresponding to the location attribute information and a corresponding portion of the date and time information in the time band-dependent content/function frequency table and the user relationship-dependent content/function table and by considering the adaptability of the use time using the content and the function to the location. According to the priority rank, menu content information for constituting the content/function selection menu is generated and transmitted to the display unit.

The display unit generates a content/function selection menu according to the menu content information and presents the menu to the identified user.

The method for displaying the content/function selection menu may be as follows. Content/function selection menu display items are hierarchically configured. When a display item of the upper-node menu has a plurality of sub menu selection branches, each of the display items of the content/function selection menu is displayed in such a manner that when the priority rank corresponding to the menu content information is high, the display item of the sub menu for selecting the content and function is arranged at a position near to the upper-node menu for selecting the sub menu display item.

Moreover, a display item for selecting a content and a function having the highest priority correlated to the menu content information among the display items of the same level is highlighted when displayed.

According to another aspect of the present invention, provided is a user interface method in a system which provides a content and a function to a user by using a server connected to a network and ubiquitous client terminals in respective locations. The server includes a server operation unit, a verification unit, a server network unit, a server storage unit, and a clocking unit. The client terminal includes a client operation unit, a display unit, a client network unit, an operation input unit, an identifier input unit, and a client storage unit.

The server network unit of the server and the client network unit of the client terminal are connected to a network.

In the client terminal, the display unit is connected to a display device, a user operation is inputted to the operation input unit by using an operation device, and the identifier input unit acquires user identification feature information for identifying an inputted user.

The server storage unit holds: a location-dependent content/function frequency table which depends on a location prepared for each of users and describes a frequency of each of contents and functions; a time band-dependent content/function frequency table which depends on a time band prepared for each of the users and describes a priority rank for each of contents and functions; a user verification database; a user relationship-dependent content/function frequency table which describes a frequency of a content and a function to be selected when other user prepared for each user is present; a function use table which describes the time used for each of the contents and functions; and at least one content or a function program. On the other hand, the client storage holds an identifier of the client terminal and a location attribute where the client terminal is installed.

When a user is present in the vicinity of the client terminal, the client calculation unit acquires user identification feature information and user coexistence relationship from the identifier input unit and transmits the user identification feature information together with the identifier of the client terminal and the location attribute to the server network unit from the client network unit via the network.

Next, the server calculation unit of the server acquires the date and time information from the clocking unit, the user identification feature information received by the server network unit, the user coexistence relationship, and the location attribute; correlates the user identifier with the user verification database so as to identify the user; acquires the location-dependent content/function frequency table, the time band-dependent content/function frequency table, and the user relationship-dependent content/function table concerning the identified user from the server storage unit; calculates the part corresponding to the location attribute information in the location-dependent content/function frequency table and calculates the part corresponding to the date and time information in the time band-dependent content/function frequency table and the user relationship-dependent content/function frequency table; calculates the corresponding part by considering the adaptability of the user time for using each of contents and functions to the location so as to calculate a priority rank for each of the contents and functions; generates menu content information to constitute a content/function selection menu according to the priority rank of each of the calculated contents and functions; and transmits the information from the server network unit via the network to the client network unit of the client.

The client calculation unit of the client terminal acquires the menu content information from the client network unit and transmits it to the display unit. According to the menu content information, the display unit generates a content/function selection menu, transmits the menu to the display device, and presents the content/function selection menu on the display device to the identified user.

When providing a function and a content of a home system which supports a life behavior, the aforementioned means can provide a selection menu display method and a selection display system in which a user can effectively select a system function and a content in a short time according to the attributes and states of the display devices arranged in respective locations and the user behavior.

BRIEF DESCRIPTION OF THE DRAWINGS

FIG. 3 shows an example of a time band-dependent content/function frequency table 201.

FIG. 5 shows an example of location-dependent content/function frequency table 203.

FIG. 6 shows an example of a user relationship-dependent content/function frequency table 204.

FIG. 7 shows an example of a location use time table 205 for management.

FIG. 8 shows an example of a content/function use time table 206.

FIG. 9 shows an example of a menu content table 211.

FIG. 12 shows an example of menu content information 131.

FIG. 20 shows a display example of the content/function menu of the user 1 alone.

FIG. 22 shows an example of a location transition table 207.

FIG. 25 shows an example of a user/content•function selection history 208.

DETAILED DESCRIPTION OF THE EMBODIMENTS

Nowadays, display devices such as a PC and a television are installed in several rooms of each home. A user can use various functions such as watching the television, viewing a program recorded, playing a video game, and sending a mail, while moving from one room to another in the home. Here, each of the display devices is significantly affected by the attribute or feature of each of the rooms where the display devices are installed. For example, in a large room such as a living room, the display device may have a large screen and can provide a high quality display and a high quality audio. On the contrary, in a small room like a lavatory and a bathroom, it is possible to use a display device having a small screen and not requiring a high quality display or high quality audio. The display device is sufficient if it can display necessary information. Moreover, it has become possible to use a water-proof display device or a semi-transparent mirror type of a display device in a lavatory and a bathroom. In the variety of display devices, there is no need of using the same content or function but it is rational to select an appropriate content and a function for each of the purposes.

However, it is not easy for the user to select a desired function from a menu containing a plenty of functions and contents. Moreover, it is considered that user's preference causes an uneven use priority of functions and contents (hereinafter, referred to simply as content/function) appropriate for each of the display devices and display timings. In order to solve this problem, the present invention provides a user interface realizing semi-automatic use support for a user by statistically extracting a content and a function from a use history of each user and constituting a menu in which the user can easily select a content and a function.

Description will now be directed to the respective embodiments with reference to FIG. 1 to FIG. 25.

Embodiment 1

Hereinafter, explanation will be given on the first embodiment with reference to FIG. 1 to FIG. 14.

The first embodiment will be explained as a method for realizing selection of a menu on a single home system used within a home. Moreover, in this embodiment, only one device is depicted in the system. However, each of the components explained below may be components of a plurality of devices. It should be noted that, a client-server type using a network will be explained in the second embodiment.

Firstly, explanation will be given on the system configuration of a user interface system according to the first embodiment with reference to FIG. 1.

Figure 1:
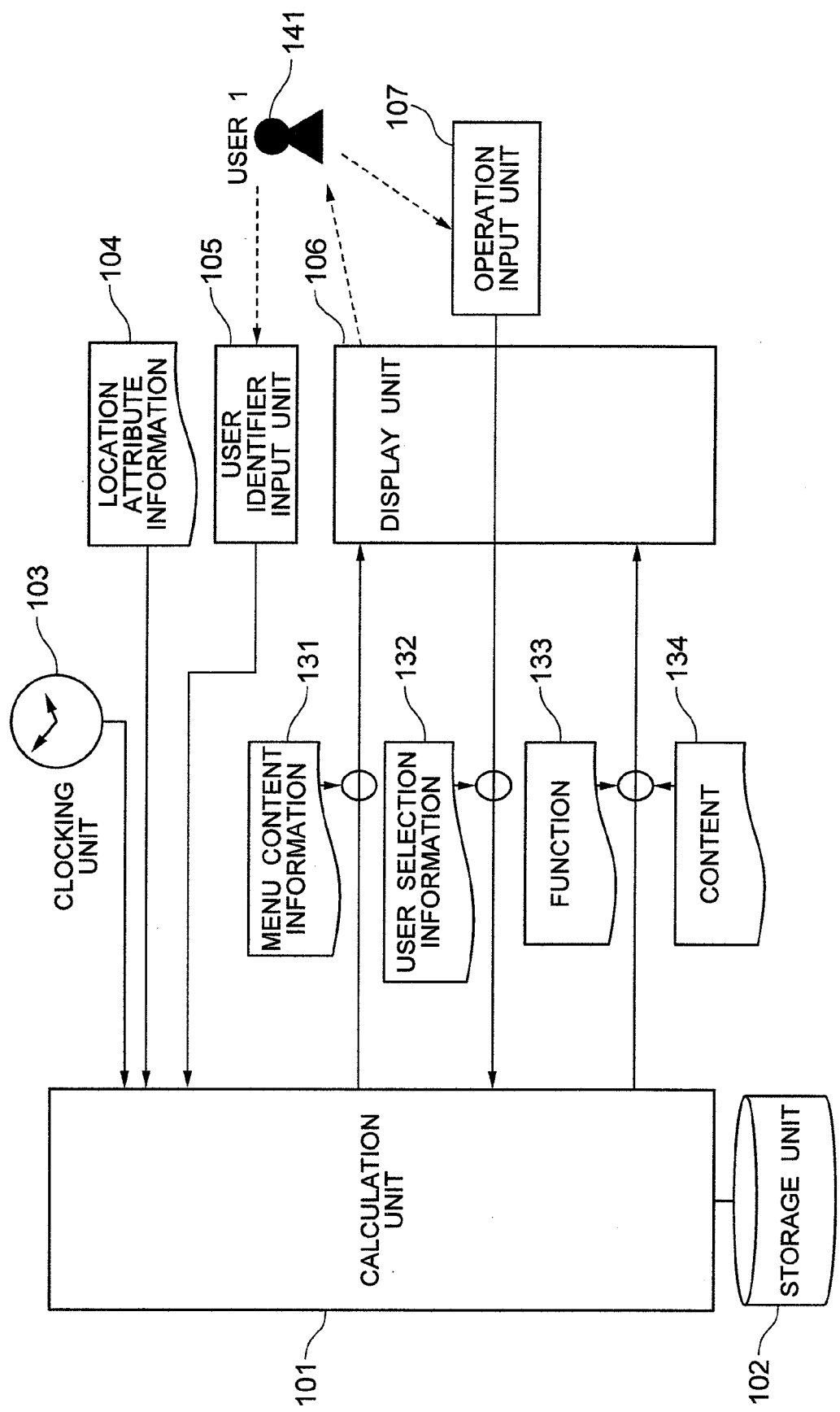
FIG. 1 is a system configuration diagram showing a user interface system according to a first embodiment of the present invention.

FIG. 1 shows a block diagram showing the system configuration of the user interface system according to the first embodiment.

As shown in FIG. 1, the user interface system of the first embodiment includes a calculation unit 101, a storage unit 102, a clocking unit 103, a user identifier input unit 105, a display unit 106, and an operation input unit 107.

Moreover, these may be formed as a single display device. For example, these may be built in a television receiver.

The calculation unit 101 is a device formed by a microprocessor which inputs various information and performs calculation for menu generation and display.

The storage unit 102 is a device such as a hard disc drive (HDD) for storing data required for the system and a program to be executed.

The clocking unit 103 controls the system clocking function and reports the current time in accordance with a request from the calculation unit 101.

The user identifier input unit 105 is a device for acquiring feature information on a user who uses the system and is formed by an imaging device such as a camera and a fingerprint acquiring device.

The display unit may be a liquid crystal display (LCD) or a plasma display (PDP) for displaying a screen.

The operation input unit 107 is a device for inputting an instruction from a user and data via a remote controller, a keyboard, a touch panel, and the like.

Here, it is assumed that from the viewpoint of the user identification and the user operation, the user identifier input unit 105, the display unit 106, and the operation input unit 107 are arranged in locations near to one another.

Location attribute information 104 indicates the location where the device is located. For example, the location may be "living room", "bedroom", or "rest room".

Menu content information 131 is data for displaying a menu.

A function 133 and a content 134 are information indicating the function and the contents for selecting the menu, respectively.

Next, explanation will be given on the data structure used for the user interface system according to the first embodiment with reference to FIG. 2 to FIG. 14.

Figure 2:
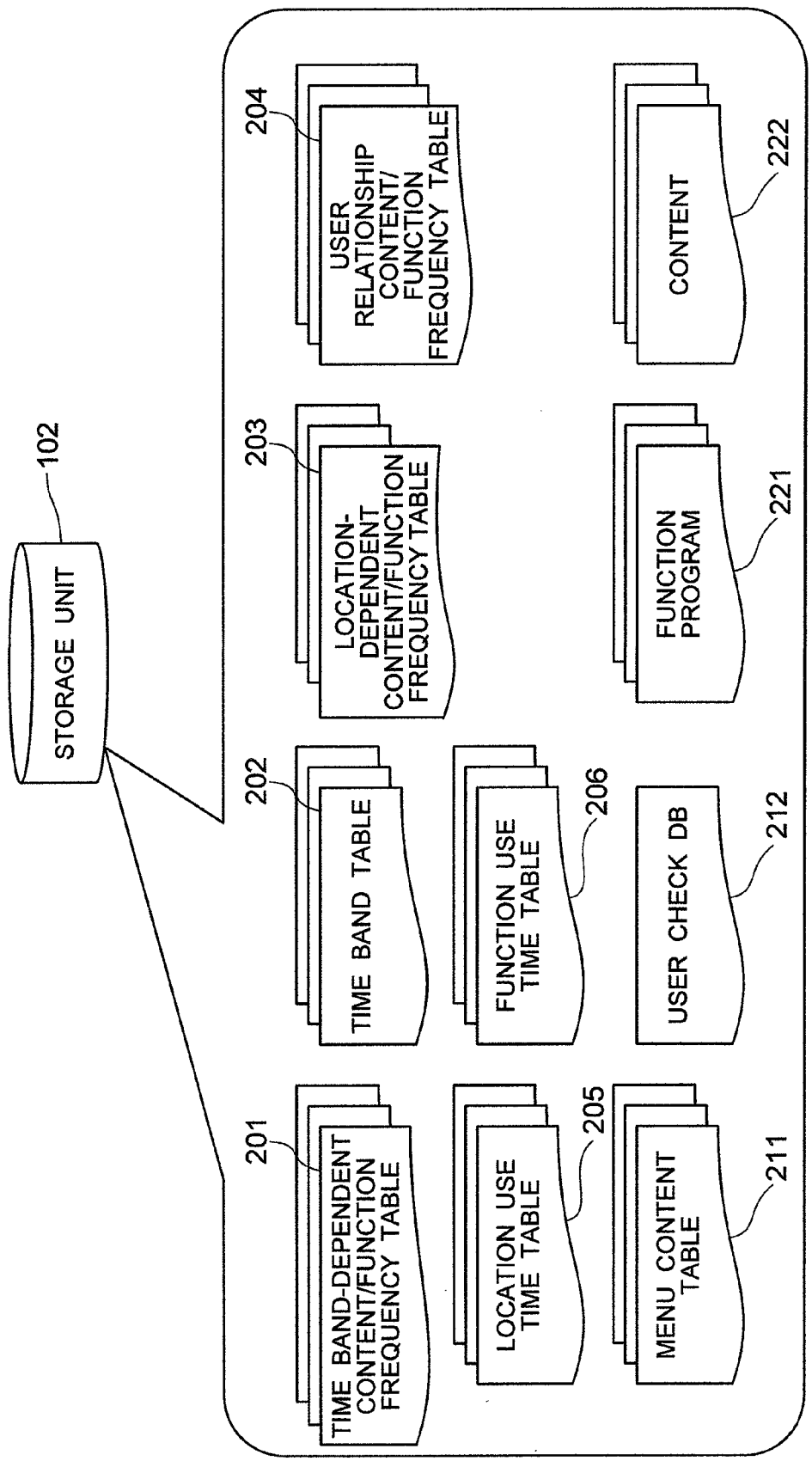
FIG. 2 is a diagram showing a list of various data stored in a storage unit 102 according to the first embodiment.

FIG. 2 shows a list of various data stored in the storage unit 102 in the first embodiment.

The various data stored here are a time band-dependent content/function frequency table 201, a time band table 202, a location-dependent content/function frequency table 203, a user relationship-dependent content/function frequency table 204, a location use time table 205, a function use time table 206, a menu content table 211, a user verification DB 211, as well as a function program 221 and a content 222 provided to a user.

Firstly, explanation will be given on the time band-dependent content/function frequency table 201 with reference to FIG. 3.

FIG. 3 shows an example of the time band-dependent content/function frequency table 201.

The time band-dependent content/function frequency table 201 shows the frequency of the content/function selected by a user for each of the defined time bands.

In this example, a table is provided for each of the users. FIG. 3 shows an example of user 1. The "TV view", "recorded program view", "mail/Web", and the like are the functions which can be selected by the user. Furthermore, in the table, genres of the content to be viewed are classified into "drama", "news, weather", "music" and the like arranged in the rows and the time bands are classified into the "get up time", "weekday morning preparation" and the like arranged in the columns so as to constitute a table. Each element at each intersection indicates the number of times (frequency) the user of the table has used the content/function at the time band of the element. The genres of the contents may be displayed further by specific contents such as a program which is often viewed and a game which is often played. Moreover, it is possible to correct the genre display by adding or deleting a genre by using an appropriate edition user interface. Here, tables which will be explained later should be matched when required.

Moreover, the time band of "get up time" and the difference between a weekday and a holiday may be set for each user by using the time band table 202 explained below.

Next, explanation will be given on the time band table 202 with reference to FIG. 4.

Figure 4:
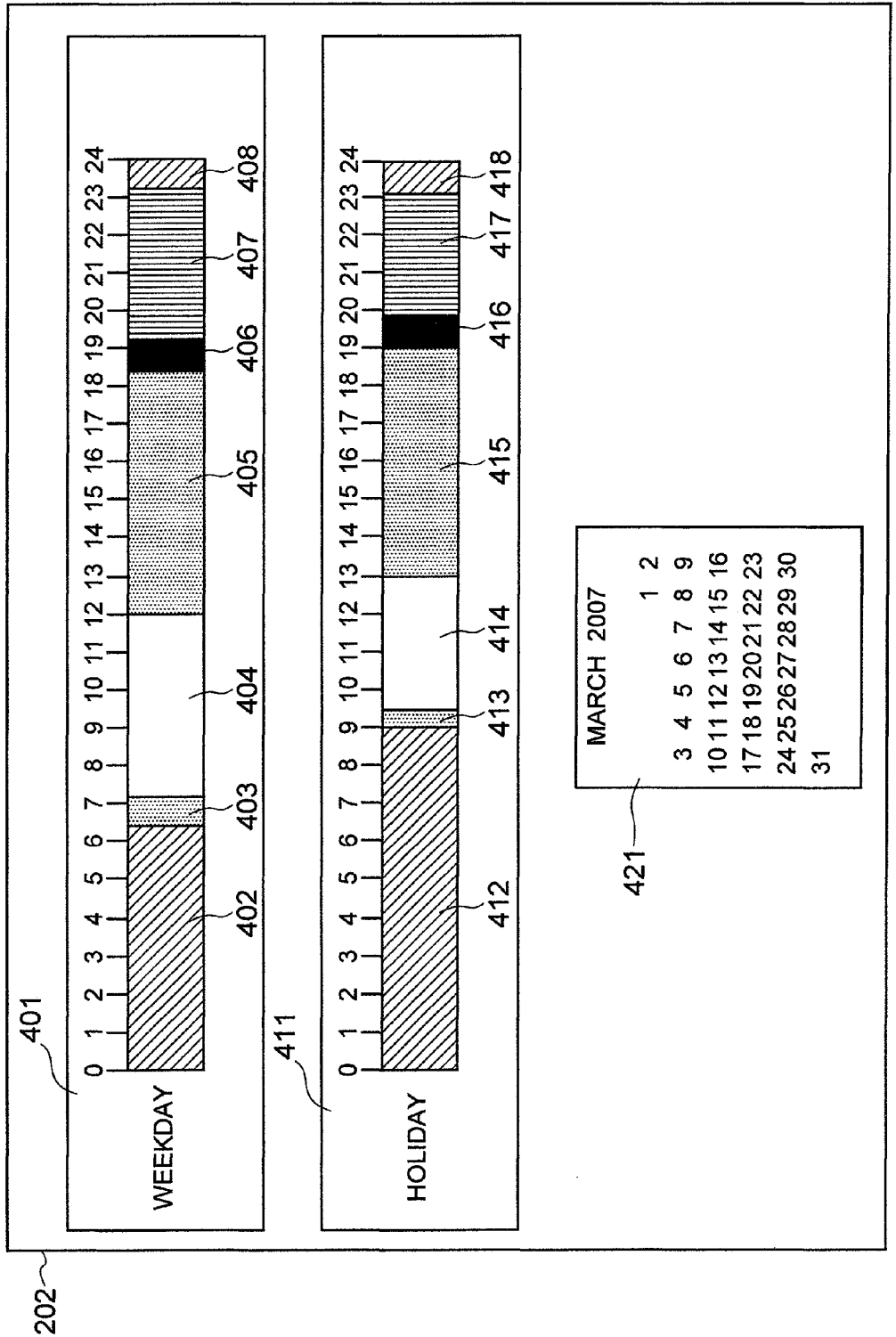
FIG. 4 shows an example of a time band-dependent table 202.

FIG. 4 shows an example of the time band table 202.

It should be noted that in FIG. 4, a weekday and a holiday are respectively divided into 24-hour divisions in a graph type so that user can easily view the time bands.

The time band table 202 is a table for specifically defining the user time band to be referenced by other tables.

The respective divisions are classified into time bands as follows: on weekdays, the time band from 0:0 to 6:30 is "sleeping" 402, the time band from 6:00 to 7:15 is "weekday morning preparation" 403, and the time band from 7:15 to 12:00 is "weekday AM" 404. The holiday divisions are also classified into the time bands 411. A new time band may be added or an existing time band may be deleted or corrected by using an appropriate edition user interface. Moreover, it is possible to separately provide a map 421 showing which weekday or holiday corresponds to which day on a calendar. Moreover, it is possible to define the table under various conditions such as the day of the week, the season of the year, or the user's anniversary. Moreover, each of the maps may be added, deleted, or corrected by using an appropriate user interface. Here, the associated tables are matched.

Next, with reference to FIG. 5, explanation will be given on the location-dependent content/function frequency table 203. FIG. 5 shows an example of the location-dependent content/function frequency table 203.

The location-dependent content/function table 203 shows a frequency of the content/function selected by the user for each of the locations.

In FIG. 5, the same contents/functions as the time band-depending content/function table 201 shown in FIG. 3 are arranged in the rows and the location attributes such as "living room" and "bedroom 1" are arranged in the columns to constitute a table. Each of the elements at each of the intersections records the number of times (frequency) the user has used the content/function at the location of the element. Here, the locations may be general items registered in advance and they may be added, deleted, or corrected by a more appropriate user interface. In this case, each of the tables should be matched.

Next, with reference to FIG. 6, explanation will be given on the user relationship-dependent content/function frequency table 204.

FIG. 6 shows an example of the user relationship-dependent content/function table 204.

The user relationship-dependent content/function frequency table 204 shows the frequency of the content/function selected by the user for each of the conditions when a user is present together with other users.

In this figure, the same contents/functions as the time band-dependent content/function table 201 shown in FIG. 3 and the location-dependent content/function table 203 shown in FIG. 5 are arranged in the rows and "user alone", "user 2", "user 3", "two or more persons", "person 1 other than family" and other present user condition are arranged in the columns so as to constitute a table. Each of the elements at each of the intersections records the number of uses (frequency) if other than the user is present when the user uses the content/function. However, "user alone" indicates the number of times when no other user is present. The present user conditions may be a general item registered in advance or may be added, deleted, or corrected by using a more appropriate user interface at each home. In this case, each of the tables should be matched.

Next, with reference to FIG. 7, explanation will be given on the location use time table 205 for management.

FIG. 7 shows an example of the location use time table 205 for management.

The location use time table 205 statistically shows the use time and use frequency of each location where the device is located for a particular time band.

In the table of this figure, for the time band of "weekday preparation", the location attribute such as "living room" and "bedroom 1" of the location attribute information 104 are arranged in the rows and the use time at each of the locations are arranged in the columns. The use time stores "shortest", "longest", "average", "total", and "the number of times" calculated according to the time and frequency of use of the respective locations by the user.

Next, with reference to FIG. 8, explanation will be given on the content/function use time table 206.

FIG. 8 shows an example of the content/function use time table 206.

The content/function use time table 206 statistically shows the use time and the use frequency of each of the contents/functions for a particular time band.

In the table of FIG. 8, the same contents/functions as the time band-dependent content/function frequency table 201 shown in FIG. 3, the location-dependent content/function frequency table 203 shown in FIG. 5, and the user relationship-dependent content/function frequency table 4 are arranged in the rows and the respective function use times for the time band of "weekday morning preparation" are arranged in the columns. Here, the use time stores "shortest", "longest", "average", and "total" calculated according tot the time used by the user to use the respective functions.

Next, with reference to FIG. 9, explanation will be given on the menu content table 211.

FIG. 9 shows an example of the menu content table 211.

The menu content table 211 is a table holding information for displaying the menu structure.

The figure describes the content to be displayed on the menu used by the user to select a content/function. That is, a function program associated with each of the rows as the unit, a parameter to be given to the function program, and a display content to be displayed as a menu are described. Moreover, sets are divided so as to hierarchically display them as sub-menu. That is, grouping is performed with the number described in the set number. 0 is displayed as a main menu. When the function program is "sub-menu display", the number indicated by the parameter corresponds to the set number of the sub-menu and the group belonging to the set number is displayed as a sub-menu. In the example of this figure, as sub-menus of the display item "TV", "drama", "news/weather", "music" and the like are displayed. Here, the display content indicates a character string to be displayed when actually displaying the menu.

Next, with reference to FIG. 10, explanation will be given on the user verification DB 212.

Figure 10:
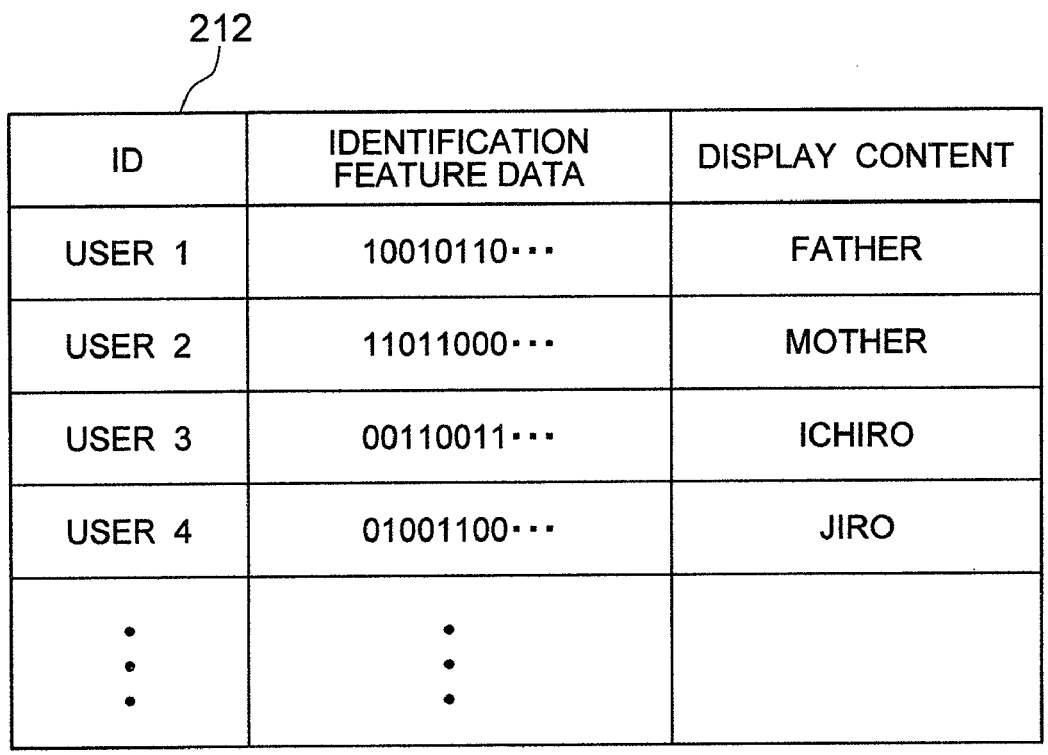
FIG. 10 shows an example of a user verification DB 212.

FIG. 10 shows an example of user verification DB 212.

The user verification DB 212 is a database holding feature information for identifying a user inputted from the user identifier input unit and used for user matching. The figure describes a user identifier ID, identification feature data used for algorithm for user identification, and a display content used when performing display.

Next, with reference to FIG. 11 to FIG. 19, explanation will be given on the user interface method, the menu generation, and the menu display process according to the first embodiment.

Figure 11:
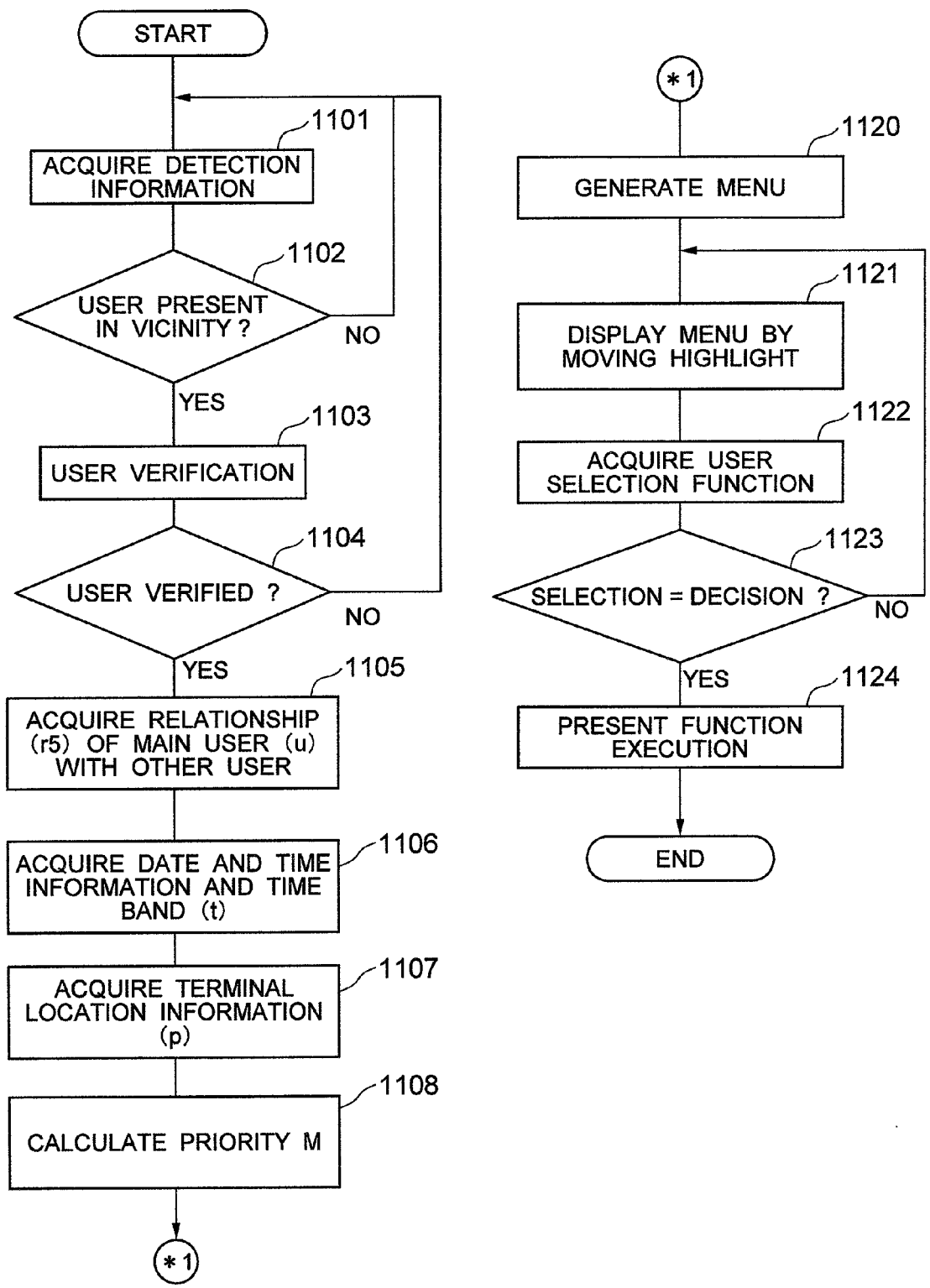
FIG. 11 is a flowchart showing a menu creation process and a menu display process.

FIG. 11 is a flowchart showing the menu generation and the menu display process.

FIG. 12 shows an example of the menu content information 131.

Figure 13:
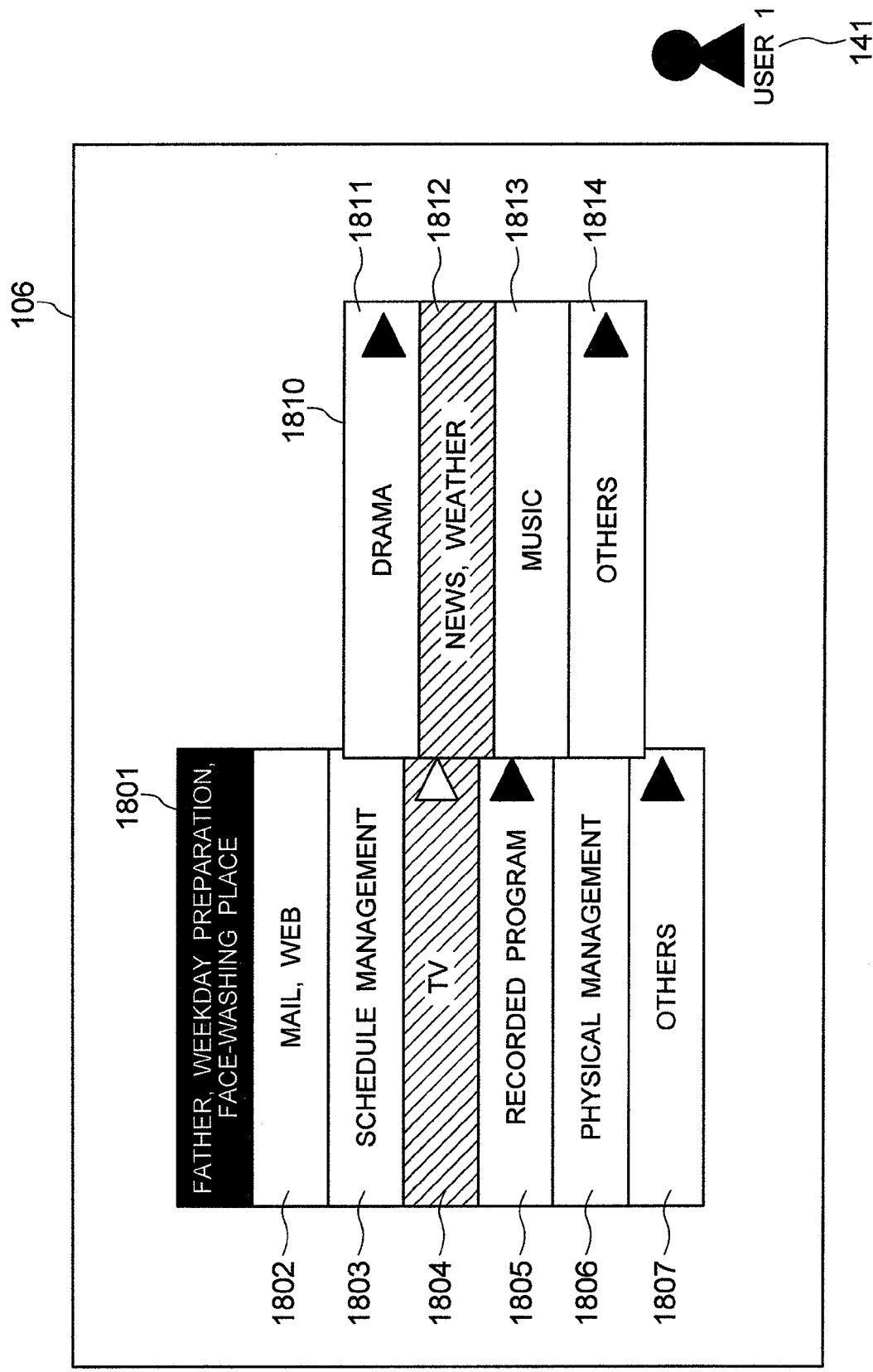
FIG. 13 shows a display example of a content/function selection menu.

FIG. 13 shows a display example of a content/function selection menu.

The process shown in FIG. 11 is performed in the calculation unit 101 shown in FIG. 1

Firstly, the user identifier input unit 105 is used to acquire information on whether the user is present in the vicinity (step 1101). If the detected information indicates that the user is present in the vicinity of the display device and can use the device (step 1102), the identification feature information is requested for identifying the user so as to perform matching with the user verification DB 212 (step 1103). Here, if a plurality of users are identified, a main user is distinguished from the other users. Here, the user identifier input unit 105 may be a specific device such as a camera if identification is performed by a user face, or a microphone if identification is performed by voice, or identification may be performed by using biometrics such as a fingerprint and a finger vein, and means having a function to convert the data from the device into identification feature information appropriate for identification. The conversion into the identification feature information may be performed by the calculation unit 101. The identification method or the identification feature information may be based on the general user identification technique. Moreover, instead of using the identification techniques for identification, a switch operation prepared for each of the users or a series of switch operations may be used for decision by the user. Furthermore, the operations may be physical operations or operations using software. When distinguishing the main user from the other users, for example, if the identification is performed by a face, a user having the face portion imaged on the camera and having the widest area or the user having the face at the center or near the center may be decided as the main user.

When the user is identified (step 1104), the main user (u) and the other user state (r) are acquired from the user identifier input unit 105 (step 1105). Moreover, the current date and time are acquired from the clocking unit 103 to obtain the time band table 202 shown in FIG. 4 and the time band (t) (step 1106).

Next, the attribute (p) of the installation location is acquired (step 1107). For the installation location, a preset location attribute may be held in the storage unit upon installation. Alternatively, when the display unit 106 (and the user identifier input unit 105) is arranged apart from the calculation unit 101, a location attribute may be arranged together with the identifier of the display unit 106 on a table, which is held in the storage unit so that it can be selected by using the identifier. Moreover, if the device having the display unit may be moved, the location may be identified by using means for detecting the destination location such as GPS (Global Positioning System), positioning by using radio, and a sensor using infrared rays for detecting entering and leaving a room, so that the detected location is correlated with the location in a table prepared in the storage unit 102 in advance, thereby selecting the location attribute information. Moreover, the user can directly select the location attribute by using an appropriate user interface. Alternatively, when it is possible to obtain the location of the user himself/herself instead of the device location, the location attribute information may be used.

Next, by using the acquired u, r, t, p, priority rank M (flu, r, t, p) for each of the contents/functions under this condition is obtained (step 1108). The priority rank M (flu, r, t, p) for each of the contents/functions is a priority rank when a content/function selection menu is displayed for a certain content/function under a certain main user u, other user state r, a time band t, and an installation location p.

The method for obtaining the priority rank M (flu, r, t, p) for each of the contents/functions will be detailed later.

The calculation unit 101 obtains the priority rank for the content/function obtained in step 1108 and as shown in FIG. 12, adds the priority rank to each of the rows in the menu content table shown in FIG. 9 for transmission to the display unit. Here, assume that the priority rank of the part "sub-menu display" has the highest priority rank among priority ranks of the same number respectively. For example, the item of the sub-menu display 1 has priorities 0.00, 0.78, 0.01 . . . Accordingly, the maximum 0.78 is decided to be the priority.

It should be noted that the data structure in which priority is correlated to each of the rows in the menu content table shown in FIG. 9 will be referred to as menu content information 131 in the present Description.

Here, FIG. 12 shows a content/function menu indicating the priority of each of the contents/functions on the menu content table 211 when "user 1" (u) corresponding to "father" appears "alone" (r) in "lavatory" (p) in "weekday morning preparation time" (t).

Next, the display unit creates a menu by using the method using computer graphic on the display device (step 1120).

The menu creation process will be detailed later.

The content/function menu created is displayed on the display device 106 as shown in FIG. 13 (step 1121).

Here, the center of the main menu or the center of the sub-menus of the main menu, i.e., the function menu portion having the highest priority is highlighted when displayed. In the example of FIG. 13, the "TV-news/weather" having the highest priority in the menu content information 131 shown in FIG. 12 is firstly highlighted (1804, 1812). The "recorded program-news/weather" having the next highest priority is displayed immediately below (1805) the TV in the main menu and the next "schedule management" is displayed immediately above the TV (1803). After this, the display items are successively displayed in the order of "below via one sub-menu, above via one sub-menu, below via two sub-menus, above via two sub-menus, ...". The other sub-menus are also displayed in the same way so as to minimize the number of upward and downward operations when the user selects a sub-menu. Among the sub-menus in FIG. 13, the "news/weather" belonging to the "TV" has the highest priority and then "music" and "drama" follow. Thus, in the case of sub-menus, items having higher priorities are displayed near the display items of the main menu. In this example of function menu display, the main menu is treated only in the vertical direction and the sub-menus are also displayed in the same way. However, it is also possible to arrange the function items coaxially so as to use the leftward and rightward operations.

It should be noted that the aforementioned example uses the priority as information for arrangement on the menu and highlight. However, it is possible to use the information in other way. For example, it is possible to change the color of characters of the display items or change the color of the background for the content/function having a higher priority. Moreover, it is also possible to modify presence/absence of the frame of the display item, the frame width, or the background pattern.

For the menu thus displayed, the calculation unit 101 receives an instruction to modify a selection item from a user by operating the operation input unit 107 (step 1121). If the operation is other than a decision operation (step 1122), the currently highlighted portion is moved upward or downward so as to shift the highlighted item like in the general menu display (step 1121) so as to repeat the function menu display. It should be noted that the explanation has been given, assuming that a device of an operation input unit such as a remote controller is used. For example, when the display device and the operation input unit are arranged on the same plane (such as a touch panel) in which the menu display can be directly instructed, the highlighted item modification by the upward/downward operation (or leftward/rightward operations in the coaxial-shape display) is not required. It is possible to perform a direct function selection by touching a desired item displayed on the screen.

When the user operation is a decision (step 1123), the function program corresponding to the menu is executed and a process of execution or a corresponding content is presented for the display unit (step 1124). Here, in order to execute a program or present a content, it is necessary to execute a function program, transfer data to be displayed, execute operation for visualizing the data, and the like. For this, it is possible to use the generally performed method such as video display and text or pattern display.

It should be noted that if a predetermined time has elapsed without operation of menu item selection and decision by a user operation (immediately, if 0 without displaying the function menu), it is possible to assume that the content/function having the highest priority or the content highlighted last is selected and it is automatically presented to the user. Moreover, the present embodiment has been explained by using a one-stage hierarchical structure of the sub-menus. However, it is possible to increase the hierarchies. For example, it is possible to constitute a menu so as to present a specific content and its details such as "recorded program→genre→program name→scene" or present content parts based on the structure.

Next, a detailed explanation will be given on the process 1108 to obtain the priority M(f|u, r, t, p) shown in FIG. 11.

In the explanation given below, in order to obtain matching with the menu content information 131 shown in FIG. 12, it is assumed to calculate the priority for displaying the content/function menu displayed on the display unit of the lavatory when "user 1" (u) corresponding to "father" alone (r) appears.

The priority rank M (f|u, r, t, p) can be obtained by [Expression 1] given below.

[Expression 1]

$$M(f|u,r,t,p)=w_t(u,f,t) \cdot w_p(u,f,p) \cdot w_r(u,f,r) \cdot w_o(u,f,t,p)$$ (Expression 1)

According to this expression, the priority M(f|u, r, t, p) is calculated as a product of 4 coefficients using the respective tables, i.e., values expressed in [Expression 2] to [Expression 4].

The time band-dependent coefficient wt(u, f, t) shown in [Expression 2] given below shows the statistical frequency of the content/function operations which can be obtained from $Cu_{f,t}$ of the time band-dependent content/function frequency table 201 shown in FIG. 3. Here, the $Cu_{f,t}$ is an index display of the time band-dependent content/function table 201 in which f is the content/function and t is the time band. Moreover, Σ in the numerator shows the sum of elements (frequency) of the time band-dependent content/function frequency table 201 of all the contents/functions for a certain time band t.

[Expression 2]

$$w_t(u, f, t) = \frac{Cu_{f,t}}{\sum_{i=1}^{K} Cu_{i,t}}$$ (Expression 2)

More specifically, wt(u, f, t) of "TV view-news/weather" as the content/function is a value obtained by division of the total of the elements of the row 301 in the weekday preparations in FIG. 3 as a denominator by the number of times "41" of the news/weather (302) as the numerator.

Next, the location-dependent coefficient wp(u, f, p) shown in [Expression 3] given below shows the statistical frequency of the content/function operations performed by the user at the location. The coefficient is obtained from $Pu_{f,p}$ in the location-dependent content/function table 203 in FIG. 5. The $Pu_{f,p}$ is an index display of the location-dependent content/function frequency table 203 in which f is the content/function and t is the location. Moreover, Σ in the numerator shows the sum of elements (frequency) of the location-dependent content/function frequency table 203 of all the contents/functions for a certain location t.

[Expression 3]

$$w_p(u, f, p) = \frac{Pu_{f,p}}{\sum_{j=1}^{L} Pu_{i,p}} \quad \text{(Expression 3)}$$

More specifically, wp(u, p, f) of "TV view-news/weather" as the content/function is a value obtained by division of the total of the elements of the column 501 of the lavatory in FIG. 5 as a denominator by the number of times "18" of the news/weather (502) as the numerator.

Next, the user relationship coefficient wr(u, f, r) shown in [Expression 4] given below shows statistical frequency of the content/function operations in the relationship of the main user with other users. The coefficient is obtained from $Ru_{f,r}$ of the user relationship-dependent frequency table 204. The $Ru_{f,r}$ is an index display of the user relationship-dependent frequency table 204 in which f is the content/function and r is the user state.

[Expression 4]

$$w_r(u, f, r) = \frac{Ru_{f,r}}{\sum_{i=1}^{K} Ru_{i,r}} \quad \text{(Expression 4)}$$

More specifically, wr(u, f, r) of "TV view-news/weather" as the function is a value obtained by division of the total of the elements of the column 601, the user alone, as the denominator by the number of times "6" of the news/weather (602) as the numerator. It should be noted that when calculating the wt(j, f, t), wp(u, f, p), and wr(u, f, r), if the respective sums serving as the denominator are 0, all the coefficients are made to be 0. In this case the function menus are displayed in the order as the display order. Alternatively, a random number may be substituted. In this case, the function menu display order is indefinite and the method not having a particular function menu with a higher priority may be suggested to the user.

Lastly, the use time band-dependent coefficient wo (j, f, t, p) shown in [Expression 5] given below shows how the user uses a certain time band at the location. The coefficient shows the relationship between $Tp_p$ in the location use time table 205 shown in FIG. 7 indicating the time where the user stays at the location and $Tf_f$ in the content/function use time table 206 shown in FIG. 8 indicating the time used for the content/function. Here, the line on the Tpp shows an average use time when the location is p and the line on the $Tf_f$ shows an average time used for the content/function when the content/function is f.

That is, the coefficient increases as the stay time at a certain location to use the content/function increases. It can be said that the coefficient is an index that the time can be used more effectively when the user uses the content/function at the location for a certain time band.

In the case of this example, calculation is performed to obtain a reciprocal number of an absolute value of a difference between the two average values.

[Expression 5]

$$w_o(u, f, t, p) = \frac{1}{1 + |\overline{Tf}_f - \overline{Tp}_p|} \quad \text{(Expression 5)}$$

− indicates an average.

More specifically, ⅛ can be calculated from 7 seconds as a difference between the average stay time "00:05:22" (701 in the lavatory in FIG. 7 and the average use time "00:05:15" (801) used for "TV view-news/weather" in FIG. 8. Thus, by considering the user, the location, the relationship with other users, and the use state, a priority M (f|u, r, t, p) of each function is calculated as a value between 0 and 1 for each of the contents/functions.

It should be noted that it is possible to selectively use the respective dependence relationships of the four coefficients explained or not to use the coefficients. In this case, the coefficient is assumed to be 1 in the calculation.

Moreover, in this example, a primary product of the four products is obtained as in [Expression 1]. However, it is also possible to calculate the priority M (f|u, r, t, p) by other evaluation expression.

For example, it is also possible to weight a particular coefficient in the [Expression 2] to [Expression 5] by squaring, cubing, . . . , or with ½ power (root), ⅓ power, . . . It is also possible to calculate a sum of the four coefficients.

Next, referring to FIG. 14, a detailed explanation will be given on the menu generation process 1120 shown in FIG. 11.

Figure 14:
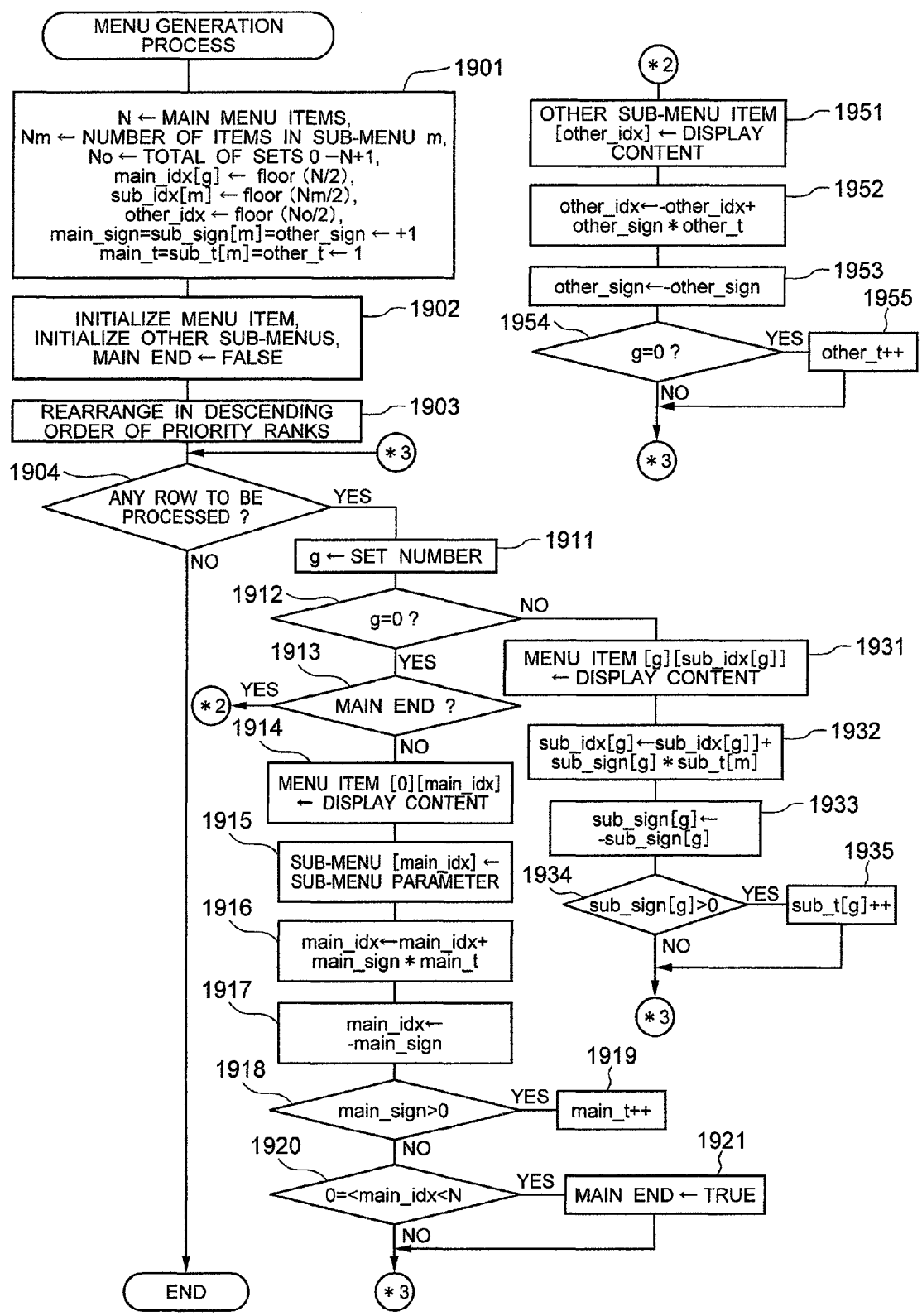
FIG. 14 is a flowchart showing details of the menu generation process 1120 shown in FIG. 11.

FIG. 14 is a flowchart showing the details of the menu generation process 1120 shown in FIG. 11.

Here, the item having the highest priority is arranged at the center and the other items are successively arranged above and below the center item and "others" are placed at the lowest position. When the number of main menu display items is greater than the items specified, they are displayed as other sub-menus. Furthermore, the sub-menus are also displayed in the same way. The item having the highest priority is arranged at the center and items having lower priority are displayed around the center item. For this, the following steps are performed.

Firstly, the value is initialized (step 1901).

Here, N is the number of main menus, Nm is the number of sub menus, No is the number of other items which is obtained as a value of the total of a set number 0 subtracted by N−1. Moreover, the main menu index main_idx, the index corresponding to the m-th sub menu sub_index[m], and other menu index othe_idx are set to integers not exceeding the half of the respective values. Furthermore, the code main_sign, sub_sign[m] (all Nm pieces), other_sign is set to +1. Moreover, the distance from the center main_t, sub_t[m] (all Nm pieces), other_t is set to 1. Next, all the variables holding the menu contents are acquired and initialized. They are substituted so that "others" are set at the lowest position. The main end flag is initialized to FALSE (step 1902). The items in the menu content information 131 are rearranged in the order of the priority ranks with the highest priority rank at the top (step 1903).

Subsequently, as will be explained below, the menu contents are substituted while looping all the content information table rows (step 1904).

Firstly, if the set number g (step 1911) is 0 (step 1912), which means the main menu contents, the display contents are substituted (step 1914) and the parameter as the sub menu number is substituted (step 1915) while the main menu configuration is false (step 1913).

The index main_idx which indicates the position where the next item is to be substituted is updated by adding the product of main_sign and main_t to the current value (step 1916). The sign of main_sign is reversed so as to enable substitution to upper and lower positions (step 1917). If the sign is positive (step 1918), main_t corresponding to the distance from the center is incremented by 1 (step 1919).

If the main_t exceeds the width of the number of main menu (step 1920), the main end flag is made to be true (step 1921).

On the other hand, if the main end flag is true in step 1913, the display content (step 1951), other_idx (step 1952), other_sign (step 1953), other_t (steps 1954, 1955) are performed for the sub-menus for the others in the same way as the respective main menus.

Moreover, if the set number g is other than 0 (step 1912), the display contents are substituted to the position of sub_idx [g] for the g-th sub-menu (step 1931) to modify sub_idx[g] (step 1932) and sub_sign[g] is reversed (step 1933). When sub_sign[g] is positive (step 1934), sub_t[g] is incremented by 1 (step 1935).

According to the present embodiment, by configuring the function selection menu considering the user, the location, and the time band, it is possible to provide a user interface method which generates a content/function selection menu which considers the attribute and the state of display devices present in respective rooms and appropriately answers to a user's behavior.

Moreover, it is possible to generate a content/function selection menu which suggests a content and a function while considering other users simultaneously existing so as to protect privacy.

Moreover, it is possible to generate a content/function selection menu capable of suggesting a content and a function by considering the time used at the location and the function when the user performs a behavior.

Furthermore, it is possible to generate a content/function menu which automatically provides a function which is normally selected by the user.

Furthermore, according to the present embodiment, it is possible to generate a content/function selection menu which can reduce the time required for display and know the user's preference by preparing functions and contents in advance.

Embodiment 2

Hereinafter, explanation will be given on the second embodiment with reference to FIG. 15 to FIG. 19.

The first embodiment has been explained as a method to realize a selection menu generation on a single home system used within a home.

In the second embodiment, an explanation will be given on case for generating and displaying a content/function selection menu by configuring a home network system by a server (home server) and a plurality of client terminals and using the user interface according to the invention.

It should be noted that in this embodiment, explanation will be given on the case to use a provision of a content or function for a menu display. However, the invention can be applied not only to a home but also to all the industrial devices requiring a display for user operations. Accordingly, the invention can be used general-purposely in various industries.

Firstly, referring to FIG. 15, explanation will be given on a system configuration of the user interface according to the second embodiment.

Figure 15:
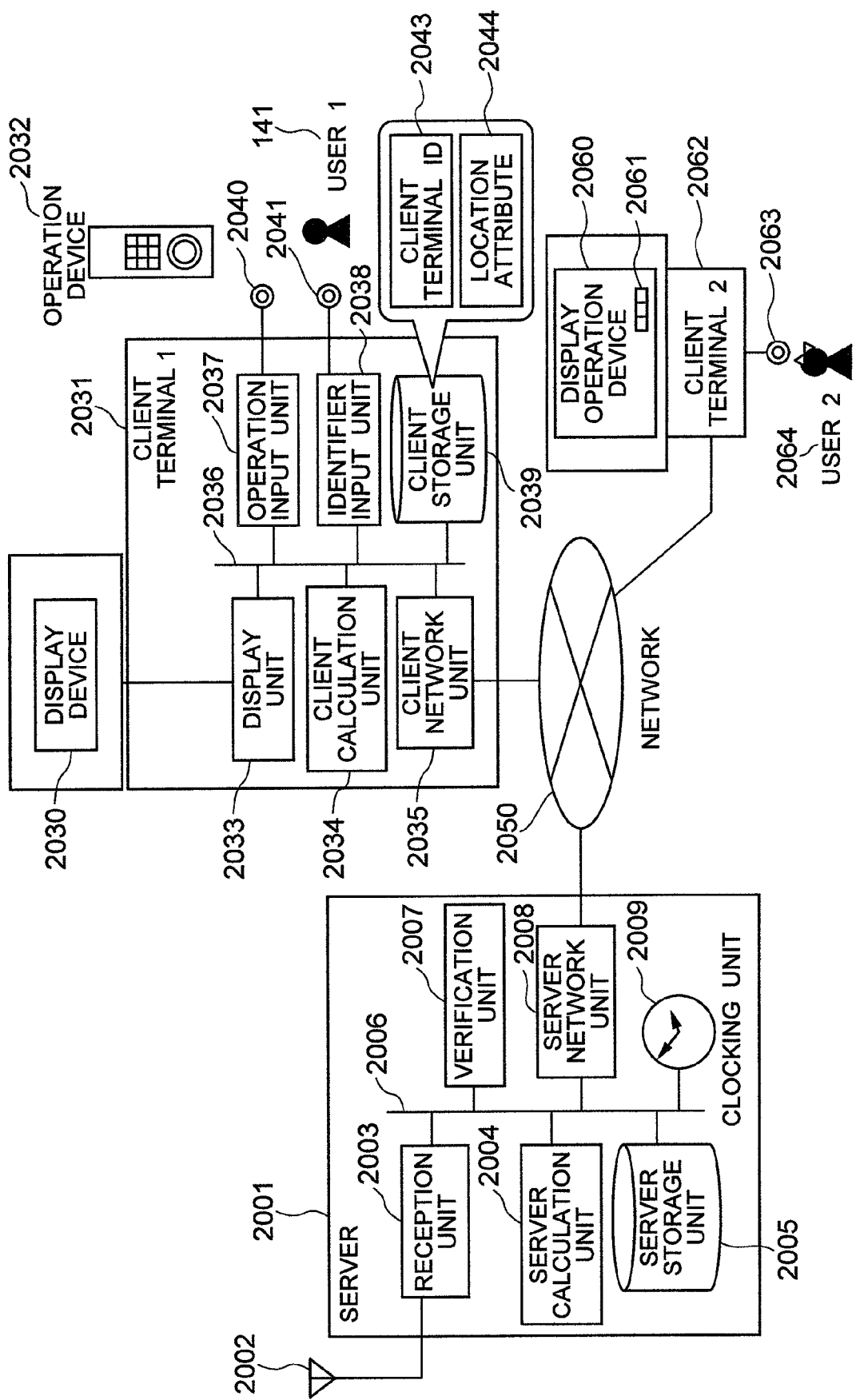
FIG. 15 is a diagram showing a system configuration of a user interface system according to a second embodiment of the present invention.

FIG. 15 is a block diagram showing the system configuration of the user interface system of the second embodiment.

The home network system of the present embodiment is formed by a server (home server) and client terminals connected to the network.

FIG. 15 shows a configuration in which a network 2050 installed in a home is connected to a server 2001, a client terminal 1 (2031) and a client terminal 2 (2062). The network may be other network means such as the Internet or the infrared communication, or Bluetooth which is in a state logically serving as a medium for communication. The server may not be in the home. In this case, connection topology between the server and the client terminals may have any form. It should be noted that it is assumed that the user identification connection is complete between the server and the client terminals by using the client terminal ID 2043.

The server 2001 includes a server calculation unit 2004, a server storage unit 2005, a verification unit 2007, a server network unit 2008, a clocking unit 2009, and a reception unit 2003.

The reception unit 2003 is connected to a communication path 2002 such as an antenna.

On the other hand, the client terminal 1 includes a client calculation unit 2034, a client network 2035, a display unit 2033, a client storage unit 2039, an operation input unit 2037, and an identifier input unit 2038.

The display unit 2033 is connected to a display device 2030 such as an LCD. Moreover, the operation input unit 2037 is connected to an operation input device 2040 which receives a signal from the operation device 2032 such as a remote controller. Furthermore, the identifier input unit 2038 is connected to an identification device 2038 such as a camera.

The client terminal 2 (2062) has an internal configuration identical to the client terminal 1 and includes a display operation device 2060 such as a touch display having a sensor for receiving an instruction from a user on the same plane as the display plane and a user identifier input device 2063 such as a camera.

Hereinafter, it is assumed that the client terminal 1 is arranged in a bedroom 1 and the client terminal 2 is arranged in a lavatory. Moreover, the client terminals 1 and 2 operate in the same way. Their operations will be explained simply as a client terminal unless otherwise specified.

As shown in FIG. 2 in the explanation of the first embodiment, the server storage unit 2005 in the server 2001 contains tables including the time band-dependent content/function table 201, the time band table 202, the location-dependent content/function frequency table 203, the user relationship-dependent content/function frequency table 204, the location use time table 205, the content/function use time table 206, the location transition table 208, the menu content table 211, the user verification DB 212; and the function program 221 provided to the user; and the content 222.

On the other hand, the client storage unit 2039 of the client terminal 1 (2031) contains a client terminal ID 2043 and a location attribute 2044 of the installation location, i.e., "bedroom 1" ("lavatory" in the case of the client terminal 2).

Next, referring to FIG. 16 and FIG. 17, an explanation will be given on a specific example of the client terminal arrangement and the terminal access by a user movement.

Figure 16:
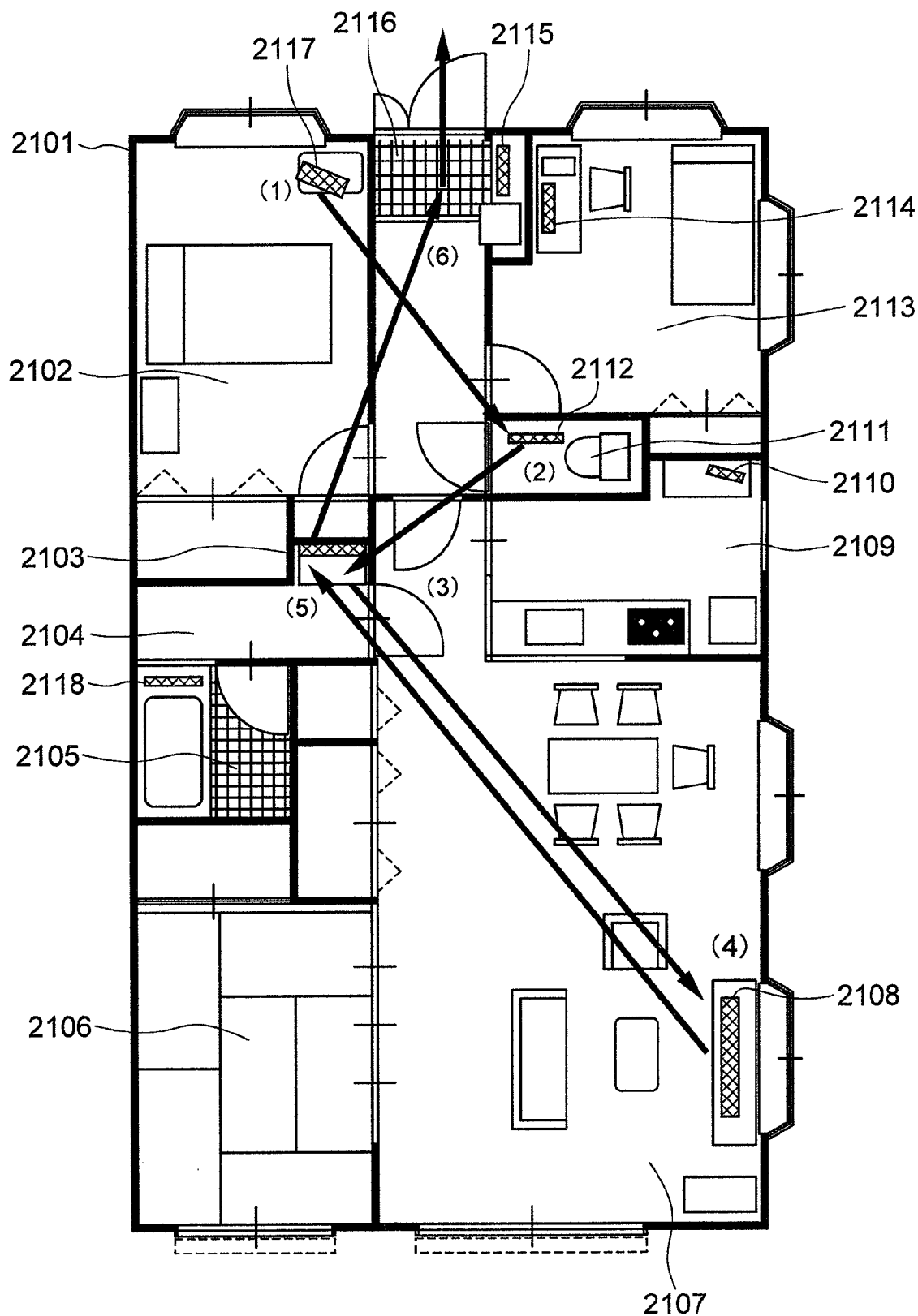
FIG. 16 is a diagram showing a specific example of a client terminal arrangement and terminal access by a user movement.

FIG. 16 shows a specific example of the client terminal arrangement and the terminal access by a user movement.

Figure 17:
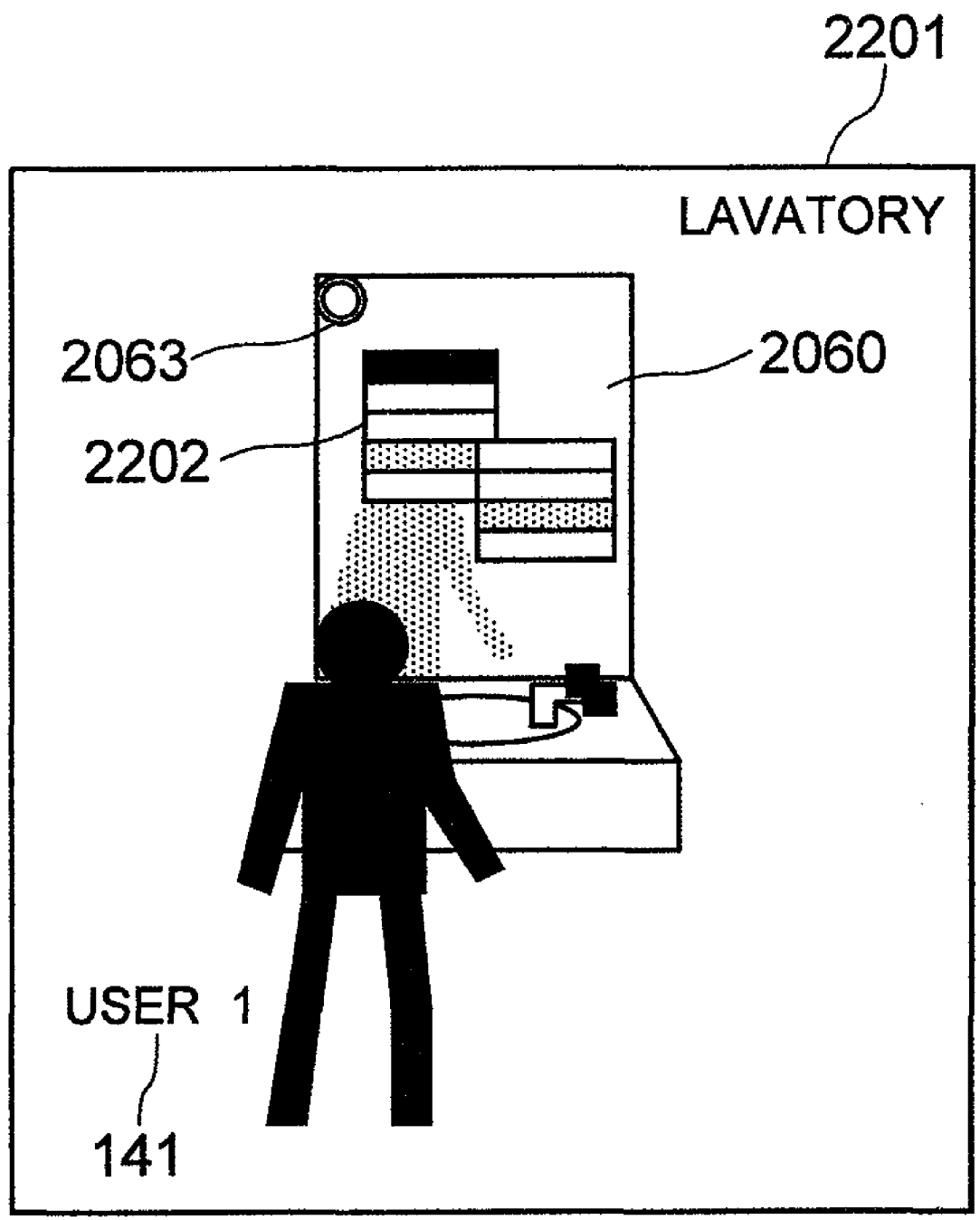
FIG. 17 shows an example of arrangement of the client terminal in a rest room.

FIG. 17 shows an example of the client terminal in the lavatory.

As shown in FIG. 16, in a home 2101, a client terminal is arranged in each of a bedroom 1 (2101), a lavatory 2104, a living room 2107, a kitchen 2109, a rest room 2111, a bedroom 2 (2113), an entrance 2115, and a bathroom 2105. The client terminals are respectively arranged at the locations 2117, 2103, 2108, 2110, 2112, 2114, and 2115.

For example, user 1 is "father" in this home and he can access the respective client terminals and receive service of various functions and contents when behaving as shown by the arrows "bedroom 1→rest room→lavatory→living room→entrance" during "weekday preparations" while performing preparations for going out to his work location on a weekday.

It is assumed that the client terminal is the client terminal 2 (2062) of FIG. 15. That is, the mirror portion 2060 of the basin is a semi-transparent mirror also serving as a display instruction unit 2060 which performs display from the rear surface and has a sensor on the front surface so that the user can input an instruction by touching with a finger. For this, the client terminal can display a content/function selection menu 220) and a content such as TV. Moreover, a camera is connected as a user identifier input device 2063 which is arranged above the basin.

Next, referring to FIG. 18, explanation will be given on the menu generation and display process according to the second embodiment.

Figure 18:
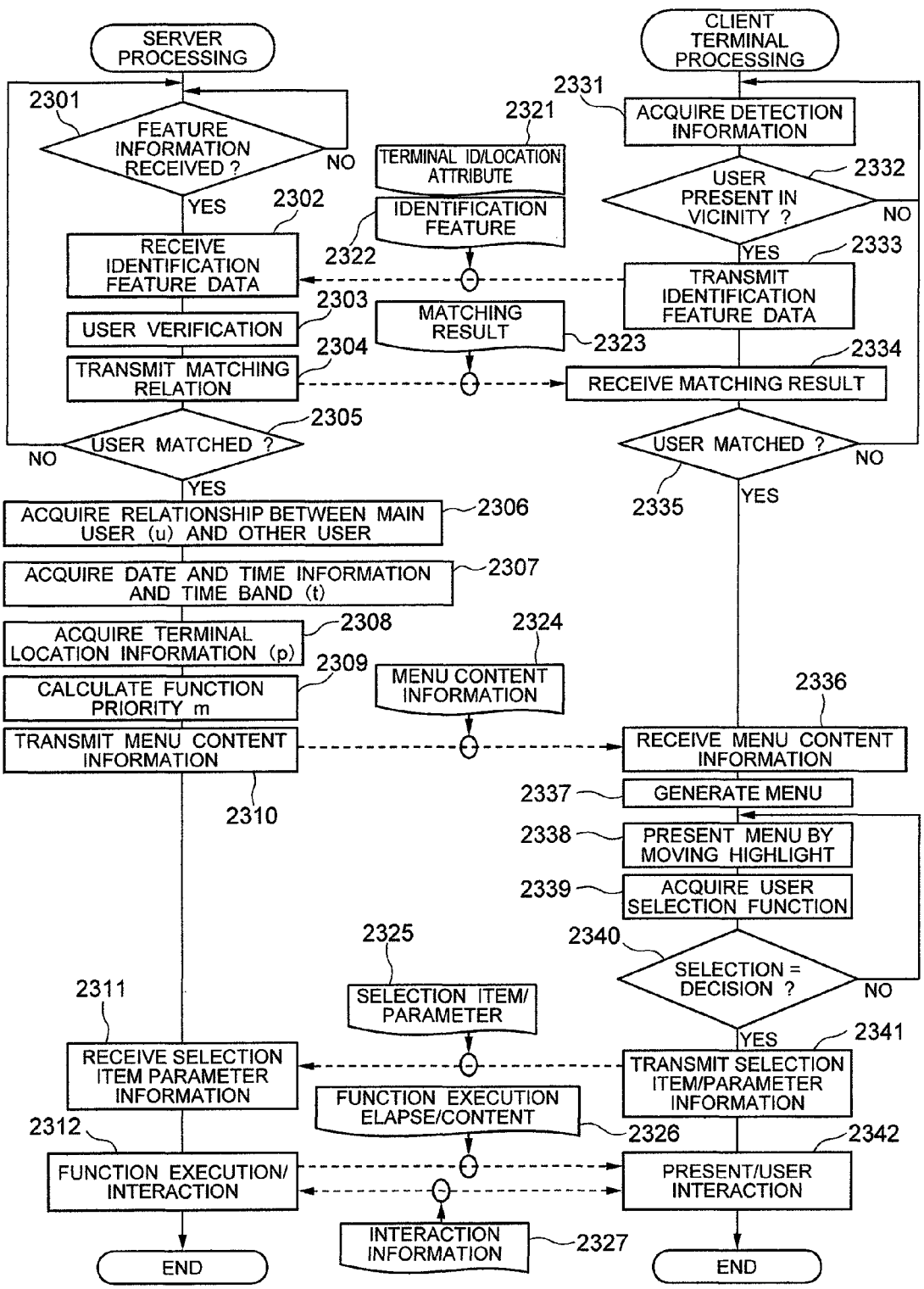
FIG. 18 is a flowchart showing a menu generation and a display process according to the second embodiment.

FIG. 18 is a flowchart showing the menu generation and display process according to the second embodiment.

FIG. 18 shows processing and data passing performed by the server calculation unit 2004 of the server and the client calculation unit 2034 of the client terminal when using the interface of the present invention between the server 2001 and a plurality of client terminals 2031, 2062.

During this process, data is transmitted and received between the calculation units (2004 and 2034) of the server 2001 and the client terminal via a network 2050 connected to the respective network units (2008 and 2035). Hereinafter, this will be referred to simply as "transmission" or "reception".

Firstly, the client calculation unit 2304 of the client terminal receives data from the identification device 2038 such as a camera by the identifier input unit 2038. In order to detect whether the user is present in the vicinity, the user identification feature information 2322 is extracted (step 2331). If the detection information shows that the user is in the vicinity of the user presence/absence display device and can use the display device (step 2332), the user identification feature information is transmitted to the server 2001 (step 2333).

Upon arrival of the user identification feature information step (2301), the server 2001 receives it (step 2301). In order to identify the user by using this, the detection information is used to perform matching with the user verification DB 212 (step 2303).

Here, if a plurality of users are identified, the main user is distinguished from the other user. The identification may be performed by using the conventional identification technique including the identification feature data format. Moreover, the identification may also be performed by operations of switches prepared for each of the users or user decision based on a series of switch operations. Furthermore, the operation may be a physical operation or an operation using software.

When distinguishing the main user from the other users, for example, when user identification is performed by a face, the user having the face portion of the largest area imaged by the camera or the user having the face imaged at the center or the near the center can be specified as the main user. The identification result 2323 is transmitted to the client side (step 2304) and it is received by the client side (step 2334).

When the user is identified, the server 2001 (step 2305) acquires the main user state (u) and the other user state (r) from the identification unit (step 2306).

Moreover, the current date and time are acquired from the clocking unit and the time band (t) is obtained from the time band table 202 shown in FIG. 4 (step 2307).

Next, the location attribute (p) of the installation location is acquired (step 2308). Here, if the location attribute is received from the client terminal, it is used. Alternatively, it is also possible to set a location attribute together with a client identifier as a pair in a table and hold the table in the server storage unit 2005 so that the location attribute is selected from the identifier. Moreover, if the client terminal can be moved, it is possible to use means for detecting a movement destination such as GPS (Global Positioning System) and a position detection system such as positioning by radio and a door way monitor in each room by infrared rays so as to verify as the one of the predefined locations of respective tables in the storage unit and use the location attribute information. Moreover, by using an appropriate user interface, the user can directly select the location attribute. Alternatively, if the location of the user can be acquired by other way instead of the location of the device, the attribute information may be transferred. Next, by using the acquired u, r, t, p, the priority M (f|u, r, t, p) of each function under the condition is acquired (step 2309). This method can use the same method as the first embodiment ([Expression 1] to [Expression 5] in the first embodiment). The menu content information 2324 describing the priority of each content/function (corresponding 131 in FIG. 17 in the first embodiment) is transmitted to the client terminal (step 2310).

The client terminal receives this (step 2336), performs menu generation by the client calculation unit (step 2337), and displays the content/function selection menu on the display device step 2338. The menu generation process and the display process are identical to the method explained in the first embodiment (FIG. 13, FIG. 14).

For the menu thus displayed, the client calculation unit 2034 operates as follows. When the operation input unit 2037 has received an instruction to change the selection item from a user by operating the operation input unit 2302 (step 2339), if the operation is other than the decision operation (step 2341), the currently highlighted item is moved upward or downward so as to shift the highlighted item in the same way as the general menu display so as to repeat the function menu display and change (step 2338). It should be noted that when the device has the display device and the operation input unit on the same plane so that the menu display can be directly instructed, it is possible to directly select a function by touching an item displayed on the screen in the same way as in the first embodiment.

If the user operation is a decision (step 2341), the selected item and parameter (selection item/parameter 2325) are acquired from the corresponding menu content information (FIG. 12 of the first embodiment) and transmitted to the server 2001 (step 2341). When the server 2001 receives this (step 2311), the server 2001 executes a function program corresponding to the content/function selection menu and presents the execution process and the corresponding content to the display device 2030 (step 2312). Here, in order to execute the program or present the content, it is necessary to execute a function program, transfer the data to be displayed, and visualize the data. These can be performed by using the method generally used such as a video display and text and pattern display. For the user operations performed here, associated interaction information 2327 is transmitted from the client terminal to the server 2001. On the other hand, a display change caused by the change of the function operation state caused by this or the content data (function execution process/content 2326) is transmitted from the server 2001 to the client terminal (2321), visualized by the client terminal which has received it, and presented to the user by the display device 2030 (step 2324).

Next, referring to FIG. 19, an explanation will be given on a display example of the content/function selection menu displayed in each of the client terminals.

Figure 19:
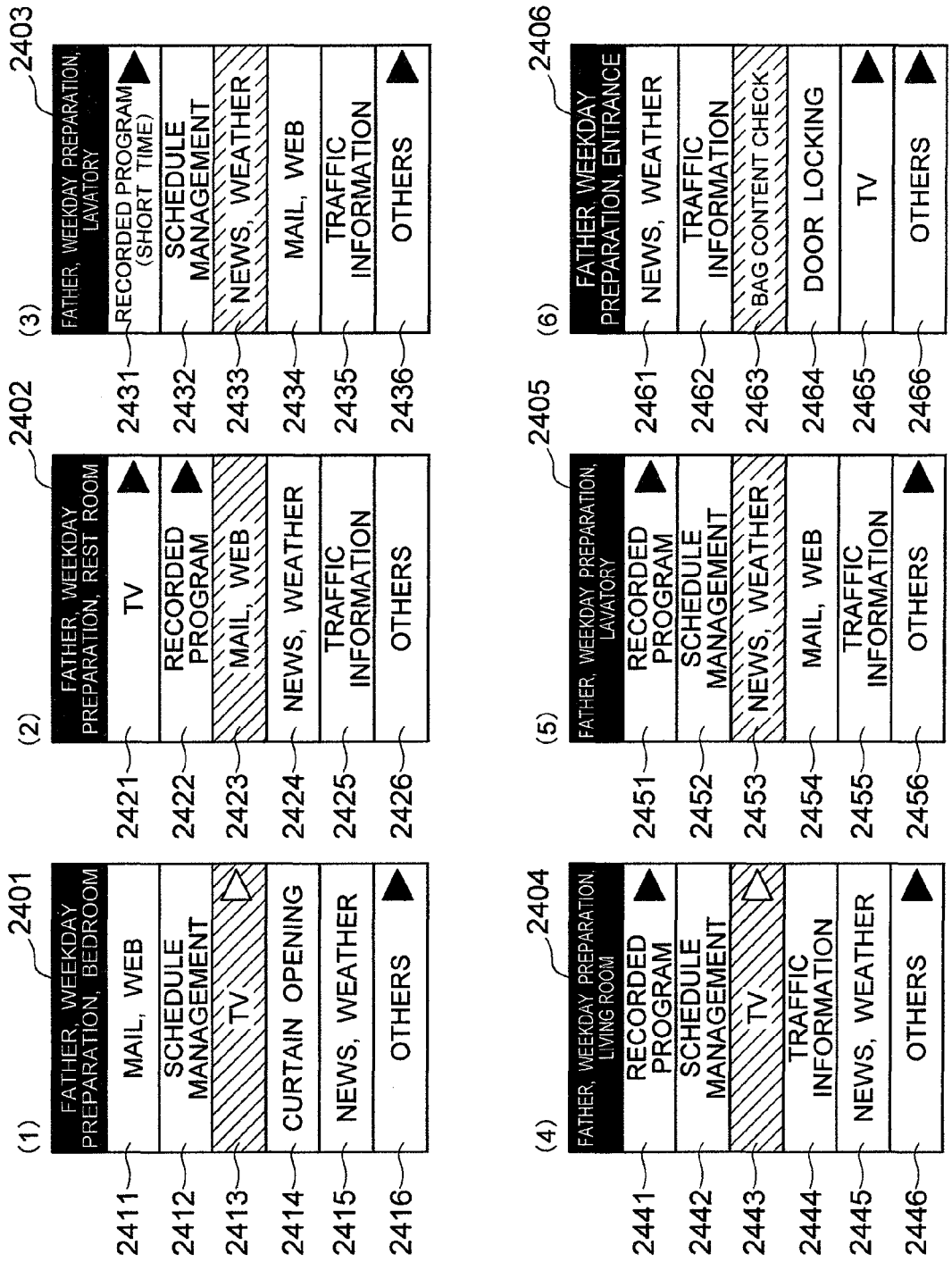
FIG. 19 shows a display example of the content/function selection menu displayed on the respective client terminals in the second embodiment.

FIG. 19 shows a display example of the content/function selection menu displayed in the respective terminals of the second embodiment.

This is a display example of respective client terminals accessed by user 1 on weekday morning. When user 1 moves as shown in FIG. 16, function menus (1) to (6) are presented, for example.

(1) When user 1 gets up in the bedroom, "TV view" has the highest priority and the "open curtain" and "schedule management" have the next highest priority.

(2) If user 1 drops in the rest room while making preparations, "mail, Web", "news/weather", "recorded program" have the higher priorities in this order.

(3) "News/weather", "mail/Web", and "schedule management" have the higher priority ranks in this order. The same applies to (4) and after.

It should be noted that in this example, it is assumed that one of the sub-menus "news/weather" concerning "TV view" is displayed on the main menu. This means that the sub-menu having the highest priority may be prompted to the main menu.

It should be noted that respective components in the server 2001 and the client terminal in the present embodiment may be exchanged in the respective devices. It is also possible to add other server so that processing is performed in it. Moreover, a process in each of the components may be software in operating in a calculation unit or hardware operation. For example, the feature extraction and correlation in the user identification may be present in specific hardware or correlation may be performed by an external server. As a result, correlation may be performed by performing connection by information transmission/reception by the network so as to present the same content/function selection menu and provide a content.

According to the present embodiment, a system provides a content and a function by a server and client terminals arranged in respective locations and connected to a network. By configuring a content/function selection menu considering the user, the location, and the time band, it is possible to generate a function selection menu corresponding to a user behavior by considering the attributes and the states of the display devices existing in the respective rooms.

Embodiment 3

Hereinafter, referring to FIG. 20 and FIG. 21, explanation will be given on the third embodiment.

In this embodiment, explanation will be given on the difference between the content/function selection menu displays between when the user is alone and when a plurality of users are present.

FIG. 20 shows a display example of the content/function menu when user 1 alone is present.

Figure 21:
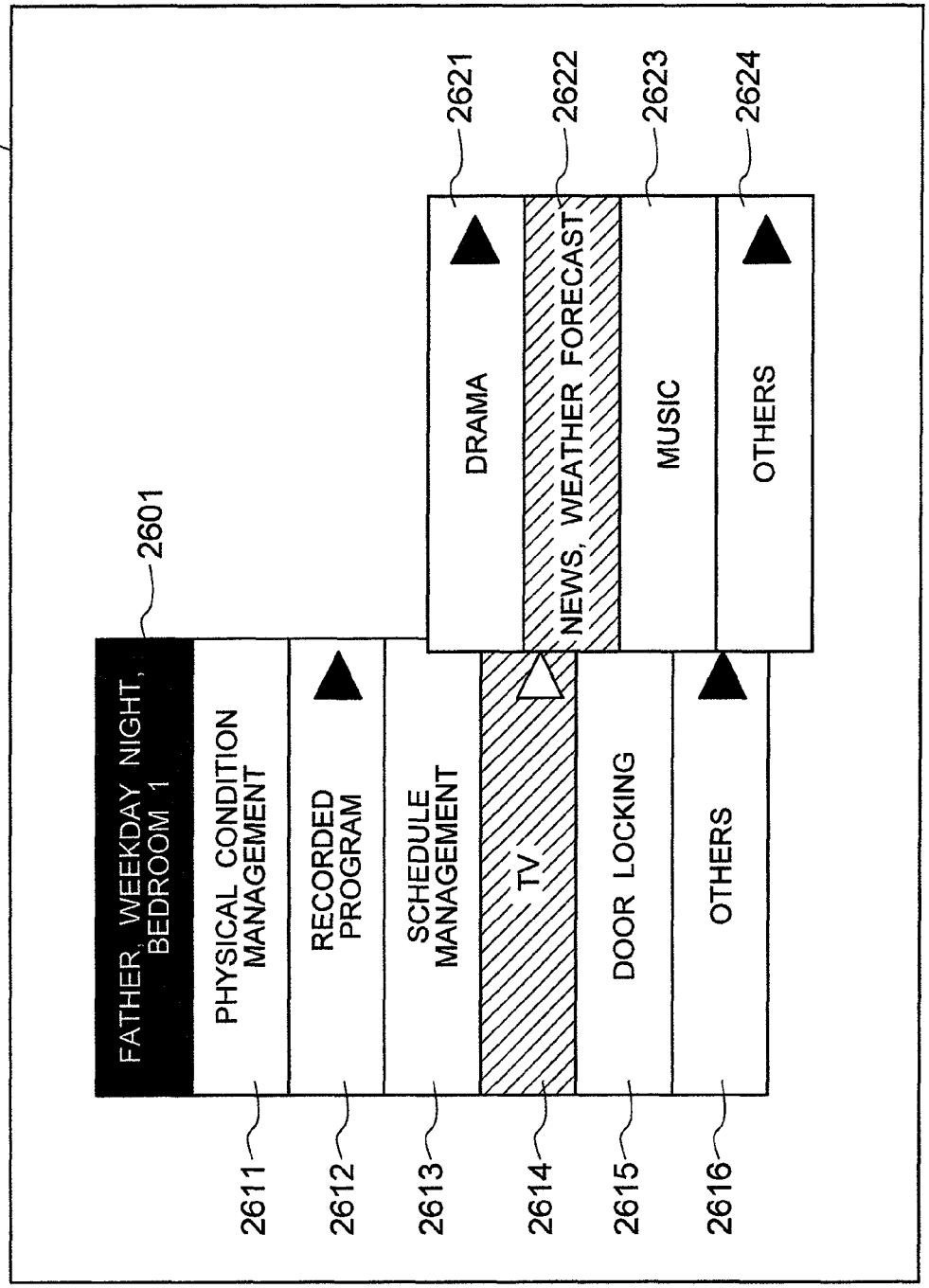
FIG. 21 shows a display example of the content/function menu when user 1 and user 2 simultaneously are present.

FIG. 21 shows a display example of the content/function menu when user 1 and user 2 are simultaneously present.

Even if the main users are identical as the identified users according to the value of the user relationship coefficient wr (u, f, r) [Expression 4] calculated by using the user relationship-depending content/function frequency table 204 shown in FIG. 6, the content/function selection menu display differs if other user simultaneously exists.

That is, the portion (2511) where "mail/Web" appears in FIG. 20, "physical condition management" (2611) appears in FIG. 21. This is because, in FIG. 6, when user 2 is present, the number of times of "physical condition management" is greater than "mail/Web" and their relationship of the left side is reversed. That is, when user 1 and user 2 are simultaneously present, it is necessary to protect privacy and consider the other user, and the "physical condition management" function is used more often than the "mail/Web" function. Thus, the function menu display can be appropriately changed.

The existence of other user may occur while providing a function and a content. Accordingly, it is possible to repeatedly perform the user identification process in the flowchart shown in FIG. 11 of the first embodiment or in FIG. 18 of the second embodiment while a function and a content are being provided and when a change is caused, it is presented to the user.

Moreover, it is possible to store the intermediate process concerning the current provision of the function and the content by the instruction input by the user and interrupt provision, after which the process flow is resumed. Thus, it is preferable to create a function program so that the interruption and resumption of the function and the content provision can be performed regardless of the user state change when the same function provision is requested.

In this embodiment, according to the coexistence of the users, it is possible to change the contents of the content/function selection menu and accordingly, to provide a user interface considering the protection of privacy or considering educational problem.

Embodiment 4

Next, referring to FIG. 22 to FIG. 24, explanation will be given on the fourth embodiment.

In this embodiment, the user location transition is analyzed so as to acquire the location transition likelihood when generating and displaying a content/function selection menu.

FIG. 22 shows an example of the location transition table 207.

Figure 23:
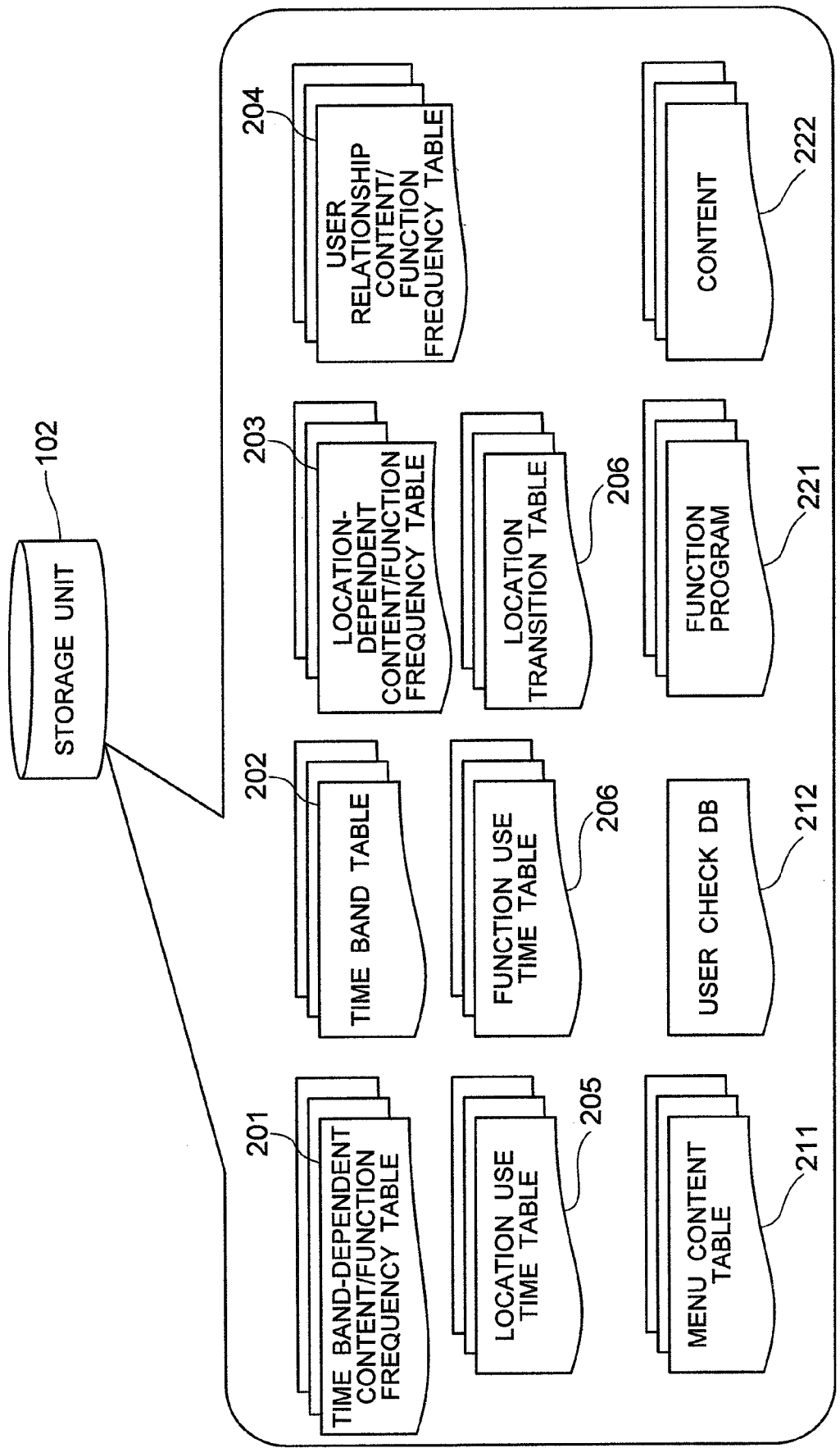
FIG. 23 is a list of various data stored in the storage unit 102 in the second embodiment.

FIG. 23 is a block diagram showing a list of various data stored in the storage 102 of the second embodiment.

Figure 24:
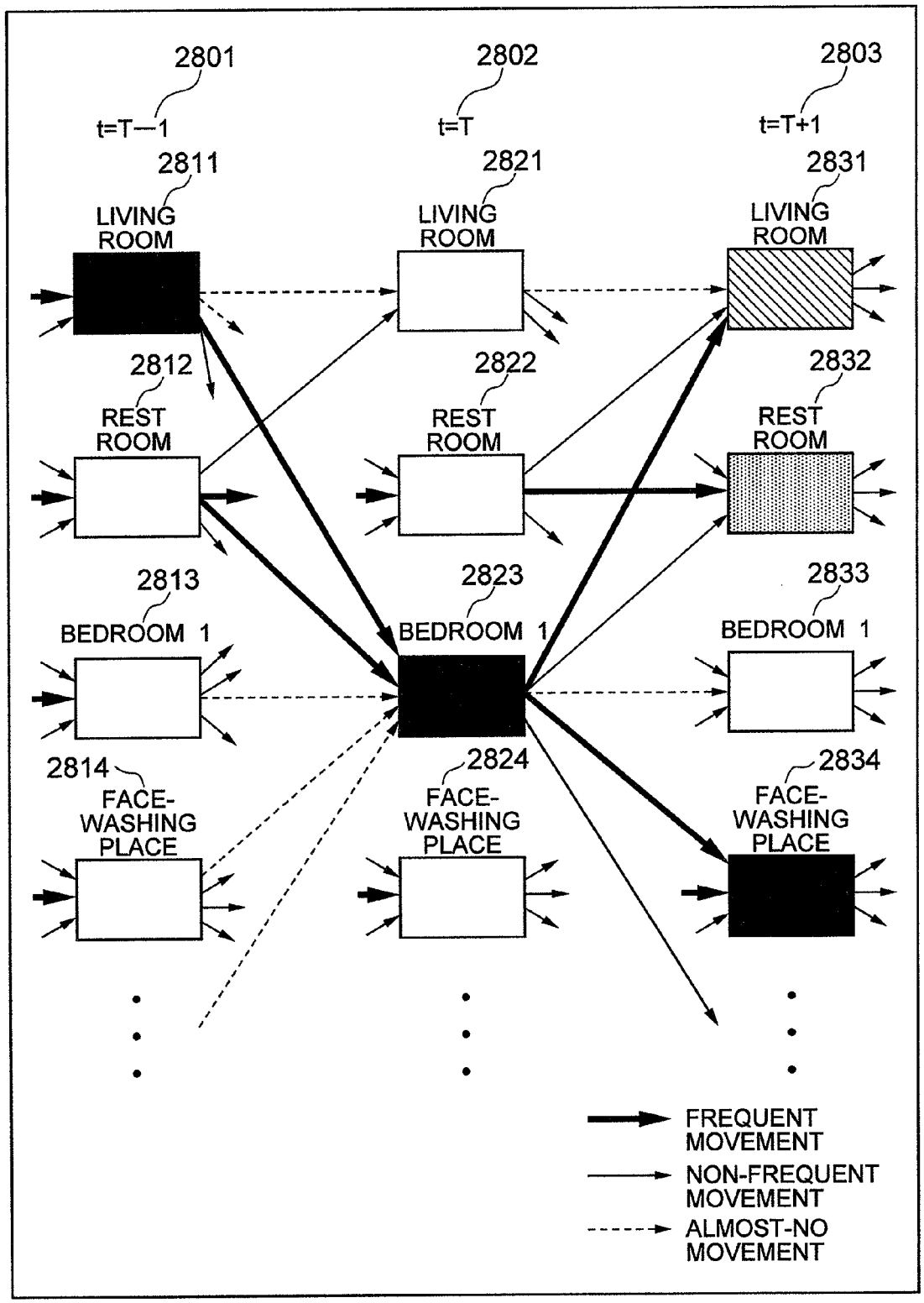
FIG. 24 explains likelihood of the location transition.

FIG. 24 shows likelihood of location transition.

As shown in FIG. 22, the location transition table 207 is a table showing the numbers of times of combinations of locations of a user before movements shown in the rows and locations after the movements shown in the columns. The location transition table 207 is prepared for each combination of the user and the time band. Moreover, as shown in FIG. 23, the storage unit 102 of the first embodiment shown in FIG. 1 holds the location transition table 207 in addition to the table shown in FIG. 2.

From this location transition table 207, the likelihood of the movement to the next location is acquired according to the number of times of a particular location for the sum of the times of the next movement to the respective locations. For example, if the user is in the bedroom 1 before the movement, the sum is obtained for the rows (2701) to be used as a denominator and the number of times after the respective movements is used as a numerator so as to obtain the likelihood.

As shown in FIG. 24, when "user 1" is in "living room", for example, moves during "weekday morning preparation", at time t=T−1 (2701), the movement destination location at the next time (t=T) has a higher likelihood in the order of "bedroom 1", "rest room", and "lavatory". Similarly, it is possible to obtain the likelihood of movement from t=T to t=T+1: "lavatory", "rest room", and "living room".

Thus, by preparing in advance transmission/reception and generation/presentation of menu content information on the content/function menu in the embodiments thus far explained for the next transition location having a higher priority, it is possible to reduce the time required to start operation of the client terminal, generating/displaying a menu, the time required to start a function program, and a time for displaying the content.

In this case, it is possible to prepare the location/function/content of the highest likelihood, the next highest likelihood, and after.

It should be noted that explanation has been given on the transition at one moment on a straight line (simple Markov process). However, it is also possible to consider in the same way if considering the past two moments. For example, it is possible to prepare a plurality of location transition tables 207 of FIG. 22 and correlate a location at a moment before one moment for each of the tables, so as to evaluate the user behavior by using the location transition in the double Markov process.

According to the present embodiment, when the user uses contents and functions while moving from a location to another location, it is possible to generate a corresponding content/function selection menu.

Moreover, in this embodiment, when the user uses contents and functions while moving from a location to another location, it is possible to estimate the next destination and prepare a content/function selection menu in advance so as to reduce the time required for display. That is, it is possible to generate a content/function selection menu by looking ahead of the user preference.

Embodiment 5

Next, referring to FIG. 25, explanation will be given on the fifth embodiment.

In this embodiment, content/function selections are stored as a history for a user.

FIG. 25 shows an example of the content/function selection history 208.

When a user selects a content/function selection menu, it is possible to obtain an operation history in the device such as the date, the start/end time, the selected function, the parameter, the location attribute, the coexistence with other user, and others as shown in FIG. 25.

The content/function selection history 208 is held in the storage unit 102 shown in FIG. 1 of the first embodiment and the server storage unit 102 shown in FIG. 15 of the second embodiment.

By this operation history, it is possible to update the time band-dependent content/function frequency table 201, the location-dependent content/function frequency table 203, the user relationship-dependent content/function frequency table 204, the location use time table 205, the function use time table 206, and the location transition table 207 (fourth embodiment).

More specifically, for example, items 1 to 6 in FIG. 25 are all time bands in "the weekday morning preparation" of "user 1". Accordingly, in the portion (301) corresponding to "the weekday preparation" in the time band-dependent content/function frequency table in FIG. 3, the elements indicating the number of times of the portions where the functions and the parameters of the respective items are matched with the functions as the rows of the table and the sub-menus are increased. The number of times of each of the matched contents is also increased in the other tables.

Thus, the system learns the user's behavior while the user selects a function from the content/function menu according to the aforementioned respective embodiments and receives a function and a content. As a result of such optimization, it can be expected that the number of operation times for the operation input unit 107 required for the content/function selection (first embodiment, FIG. 1) and the number of operation times for the operation device 2032 (second embodiment, FIG. 25) are reduced.

According to the present embodiment, by learning the history of function selections performed by the user, it is possible to generate a content/function selection menu satisfying the user's preference in details.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A user interface method in a system providing a content and a function to a user, wherein the system comprises a calculation unit, a display unit, an identifier input unit, a storage unit, a clocking unit, and operation input unit;

the storage unit holds:

a location-dependent content/function frequency table which depends on a location prepared for each of users and describes a frequency of each of contents and functions;

a time band-dependent content/function frequency table which depends on a time band prepared for each of the users and describes a priority rank for each of contents and functions;

a user verification database; and at least one content or function program;

when a user approaches the identifier input unit which is in the vicinity of the display unit;

the calculation unit, acquires user identification feature information for identifying a user inputted into the identifier input unit; clocking information from the clocking unit; and location attribute information which is attribute information on a location where the display unit and the identifier input unit are installed; and identifies a user by using the user identification feature information and the user verification database;

acquires the location-dependent content/function frequency table and the time band-dependent content/function table on the identified user from the storage unit;

calculates the part corresponding to the location attribute information in the location-dependent content/function frequency table and calculates the part corresponding to the date and time information in the time band-dependent content/function frequency table so as to calculate a priority rank for each of the contents and functions; and generates menu content information for constituting a content/function selection menu according to the priority rank and transmits it to the display device;

the display unit generates the content/function selection menu according to the menu content information and presents it to the identified user; and the storage unit further holds a user relationship-dependent content/function frequency table which describes a frequency of a content and a function to be selected when other user prepared for each user is present;

when one or more users other than the main user using the identifier input unit and the user verification database are simultaneously identified, the priority for each of the calculated contents and functions is calculated by using the user relationship-dependent frequency table concerning the main user and considering the adaptability of the content and the function under the coexistence of the other users, and the menu content information constituting the content/function selection menu is generated according to the priority.

2. A user interface method in a system providing a content and a function to a user, wherein the system comprises a calculation unit, a display unit, an identifier input unit, a storage unit, a clocking unit), and operation input unit;

the storage unit holds:

a location-dependent content/function frequency table which depends on a location prepared for each of users and describes a frequency of each of contents and functions;

a time band-dependent content/function frequency table which depends on a time band prepared for each of the users and describes a priority rank for each of contents and functions;

a user verification database; and at least one content or function program;

when a user approaches the identifier input unit which is in the vicinity of the display unit;

the calculation unit, acquires user identification feature information for identifying a user inputted into the identifier input unit; clocking information from the clocking unit; and location attribute information which is attribute information on a location where the display unit and the identifier input unit are installed; and identifies a user by using the user identification feature information and the user verification database;

acquires the location-dependent content/function frequency table and the time band-dependent content/function table on the identified user from the storage unit;

calculates the part corresponding to the location attribute information in the location-dependent content/function frequency table and calculates the part corresponding to the date and time information in the time band-dependent content/function frequency table so as to calculate a priority rank for each of the contents and functions; and generates menu content information for constituting a content/function selection menu according to the priority rank and transmits it to the display device;

the display unit generates the content/function selection menu according to the menu content information and presents it to the identified user; and the storage unit further holds a location use table which describes the use time in the location attribute prepared for each of the users and a function use table which describes the time for using the content and the function;

the calculation unit calculates a priority rank of each of the contents and function by considering the adaptability of the use time for using the contents and the functions to the location; and generates menu content information to constitute the content/function selection menu according to the priority ranks.

3. A user interface method in a system providing a content and a function to a user by using a server connected to a network and client terminals arranged in respective locations, wherein the server comprises a server calculation unit, a matching unit, a server network unit, a server storage unit, and a clocking unit;

each of the client terminals comprises a client calculation unit, a display unit, a client network unit, an operation input unit, an identifier input unit, and a client storage unit, the server network unit and the client network unit of the server and the client terminals are connected to the aforementioned network, in the client terminals, the display unit is connected to a display device and the operation input unit inputs an operation from a user by using the operation device, the identifier input unit acquires user identification feature information for identifying the user to be inputted, the server storage unit holds:

a location-dependent content/function frequency table which depends on a location prepared for each of users and describes a frequency of each of contents and functions;

a time band-dependent content/function frequency table which depends on a time band prepared for each of the users and describes a priority rank for each of contents and functions;

a user verification database; and at least one content or function program;

the client storage unit holds an identifier of the client terminal and the location attribute where the client terminal is installed, and when a user exists in the vicinity of the client terminal, the client calculation unit acquires the user identification feature information from the identifier input unit, transmits the user identification feature information together with the identifier of the client terminal and the location attribute from the client network unit to the server network, the server calculation unit acquires date and time information from the clocking unit and the user identification feature information and the location attribute received by the server network unit, correlates the user identifier with the user verification database so as to identify the user, acquires the location-dependent content/function frequency table and the time band-dependent content/function table concerning the identified user from the server storage unit, calculates the part corresponding to the location attribute information in the location-dependent content/function frequency table and calculates the part corresponding to the date and time information in the time band-dependent content/function frequency table so as to calculate a priority rank for each of the contents and functions, generates menu content information for constituting a content/function selection menu according to the priority rank of each of the calculated contents and functions, and transmits them to the client network unit of the client via the network from the server network unit; and the client calculation unit of the client terminal acquires the menu content information from the client network unit and transmits it to the display unit, the display unit generates the content/function selection menu according to the menu content information, transmits it to the display device, and presents it on the display device to the identified user.

4. The user interface method as claimed in claim 3, wherein the server storage unit of the server further holds a location transition table which describes a location transition when a plurality of terminals prepared for respective users are used, and when the system is connected to a plurality of the client terminals, the location transition table concerning the identified user is updated by:

the user identifier identified from the client terminal, the menu item selected by the user, the date and time information, and two or more continuous sets of user use information containing the date and time information and the location attribute information.

5. The user interface method as claimed in claim 3, wherein when the server receives the user use information from one of the client terminals, the server calculation unit of the server references the location transition table and estimates other client terminal to which the client terminal transits next, acquires the location-dependent content/function frequency table and the time band-dependent content/function frequency table concerning the identified user when the identified user transits to the other client terminal, calculates the part corresponding to the location attribute information concerning the estimated client terminal in the location-dependent function frequency table and the part corresponding to the date and time information in the time band-dependent content/function frequency table so as to calculate a priority rank of each of the contents and the functions, generates menu content information to constitute a function selection menu for each of the calculated contents and functions, and transmits the menu content information from the server network unit via the network to the estimated other client terminal in advance.

6. The user interface method as claimed in claim 5, wherein when the server receives the user use information from one of the client terminals, the calculation unit of the server references the location transition table so as to estimate other client terminal to which the identified user transits next, and if the identified user transits to the vicinity of the estimated client terminal, the content and the function item which make the priority highest is selected from the contents and items in the menu content information, the content or function program which satisfies the selected content and the function item is selected, and the content or the function program or the state information upon execution of the function program is transmitted from the server network unit via the network to the estimated other client terminal in advance.

7. A display device for providing contents and functions to a user, comprising:

a calculation unit, a display unit, an identifier input unit, a storage unit, a clocking unit, and an operation unit;

wherein the storage unit holds:

a location-dependent content/function frequency table which depends on a location prepared for each of users and describes a frequency of each of contents and functions, a time band-dependent content/function frequency table which depends on a tine band prepared for each of the users and describes a priority rank of each of the contents and functions, a user verification database, and at least one content or a function program;

wherein when a user approaches the identifier input unit which is in the vicinity of the display unit, the calculation unit performs operations of:

acquires user identification feature information for identifying a user inputted to the identifier input unit, clocking information from the clocking unit, and location attribute information as attribute information on a predetermined location where the display unit and the identifier input unit are installed, identifies the user by using the user identification feature information and the user verification database, acquires the location-dependent content/function frequency table and the time band-dependent content/function frequency table concerning the identified user from the storage unit, calculates the part corresponding to the location attribute information in the location-dependent content/function frequency table and the part corresponding to the date and time information in the time band-dependent content/function frequency table so as to calculate a priority rank for each of the contents and functions, and generates menu content information constituting the content/function selection menu in accordance with the priority rank and transmits it to the display unit; and the display unit generates the content/function selection menu on the display screen according to the menu content information and displays the menu to the identified user; and the storage unit further holds a user relationship-dependent content/function frequency table which describes a frequency of a content and a function to be selected when other user prepared for each user is present;

when one or more users other than the main user using the identifier input unit and the user verification database are simultaneously identified, the priority for each of the calculated contents and functions is calculated by using the user relationship-dependent frequency table concerning the main user and considering the adaptability of the content and the function under the coexistence of the other users, and the menu content information constituting the content/function selection menu is generated according to the priority.

8. A user interface which provides contents and function to a user by using a server connected to a network and client terminals arranged at respective locations, wherein the server comprises a server calculation unit, a verification unit, a server network unit, a server storage unit, and a clocking unit;

the client terminal comprises a client calculation unit, a display unit, a client network unit, an operation input unit, and a client storage unit;

the server network and the client network unit of the server and the client terminal are connected to the network;

in the client terminal, the display unit is connected to a display device and an operation from a user is inputted to the input unit by using the operation device;

the identifier input unit acquires user identification feature information for identifying an inputted user;

the server storage unit holds:

a location-dependent content/function frequency table which depends on a location prepared for each of the users and describes a frequency of each of the contents and functions, a time band-dependent content/function frequency table which depends on a time band prepared for each of the users and describes a priority rank for each of the contents and functions, a user verification database, and at least one content and a function program;

the client storage unit holds:

the identifier of the client terminal and the location attribute where the client terminal is installed, and when a user exists in the vicinity of the client terminal, the client calculation unit acquires the user identification feature information from the identifier input unit, and transmits the user identification feature information together with the identifier of the client terminal and the location attribute from the client network via the network to the server network;

the server calculation unit of the server acquires date and time information from the clocking unit and the user identification feature information and the location attribute received by the server network unit, correlates the user identifier with the user verification database so as to identify the user, acquires the location-dependent content/function frequency table and the time band-dependent content/function table concerning the identified user from the server storage unit, calculates the part corresponding to the location attribute information in the location-dependent content/function frequency table and calculates the part corresponding to the date and time information in the time band-dependent content/function frequency table so as to calculate a priority rank for each of the contents and functions, generates menu content information for constituting a content/function selection menu according to the priority rank of each of the calculated contents and functions, and transmits them to the client network unit of the client via the network from the server network unit; and the client calculation unit of the client terminal acquires the menu content information from the client network unit and transmits it to the display unit;

the display unit generates the content/function selection menu according to the menu content information, transmits it to the display device, and presents it on the display device to the identified user.

* * * * *